(12) United States Patent
Miller et al.

(10) Patent No.: US 11,511,963 B2
(45) Date of Patent: Nov. 29, 2022

(54) FISH TAPE ASSEMBLY

(71) Applicant: MILWAUKEE ELECTRIC TOOL CORPORATION, Brookfield, WI (US)

(72) Inventors: Justin Miller, Richfield, WI (US); Aaron C. Grode, Germantown, WI (US); Nolan J. Henton, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 17/102,634

(22) Filed: Nov. 24, 2020

(65) Prior Publication Data

US 2021/0078821 A1    Mar. 18, 2021

Related U.S. Application Data

(63) Continuation of application No. 16/361,344, filed on Mar. 22, 2019.

(60) Provisional application No. 62/774,707, filed on Dec. 3, 2018, provisional application No. 62/732,216, filed on Sep. 17, 2018, provisional application No. 62/647,201, filed on Mar. 23, 2018.

(51) Int. Cl.
*H02G 1/00* (2006.01)
*B65H 75/44* (2006.01)
*B65H 75/28* (2006.01)
*H02G 1/08* (2006.01)

(52) U.S. Cl.
CPC ......... *B65H 75/4428* (2013.01); *B65H 75/28* (2013.01); *B65H 75/4486* (2013.01); *H02G 1/083* (2013.01); *H02G 1/085* (2013.01); *B65H 2701/376* (2013.01)

(58) Field of Classification Search
CPC .......................... B65H 75/305; B65H 75/406; B65H 75/4428; B65H 75/4486; B65H 75/28; B65H 2701/376; H02G 1/083
See application file for complete search history.

(56) References Cited

U.S. PATENT DOCUMENTS 2,556,484 A    6/1951    Raney
2,600,722 A    6/1952    Atkinson
(Continued)

FOREIGN PATENT DOCUMENTS

DE    102005021180 A1    11/2006
KR    101215454 B1    12/2012
(Continued)

OTHER PUBLICATIONS

International Search Report and Written Opinion for Application No. PCT/US2019/023517 dated Jul. 4, 2019 (16 pages).
(Continued)

*Primary Examiner* — Lee D Wilson
(74) *Attorney, Agent, or Firm* — Michael Best & Friedrich LLP

(57) ABSTRACT

A fish tape tool includes a housing and a chamber defined in the housing. A drum is configured to be inserted into the chamber of the housing. The drum contains a fish tape. The drum is rotatable relative to the housing to dispense or retract the fish tape from the housing. The drum is one of a plurality of drums that are insertable into and removable from the chamber of the housing. Each drum contains a different type of fish tape.

19 Claims, 25 Drawing Sheets

(56) References Cited

U.S. PATENT DOCUMENTS

| | | | |
|---|---|---|---|
| 2,689,709 | A | 9/1954 | Waldschmidt |
| 2,743,884 | A | 5/1956 | Briggs |
| 2,750,152 | A | 6/1956 | Schinske |
| 2,913,222 | A | 11/1959 | Kuzara |
| 2,969,953 | A | 1/1961 | Shaw, Jr. |
| 3,145,927 | A | 8/1964 | Prouty |
| 3,145,972 | A | 8/1964 | Sweeney |
| 3,258,246 | A | 6/1966 | Turk et al. |
| 3,355,123 | A | 11/1967 | Schinske |
| 3,355,148 | A | 11/1967 | Botello et al. |
| 3,424,435 | A | 1/1969 | Niemann |
| 3,528,644 | A | 9/1970 | Scott |
| 3,601,330 | A | 8/1971 | Minobe |
| 3,744,006 | A | 7/1973 | O'Loughlin |
| 3,858,848 | A | 1/1975 | Macfetrich |
| 4,413,808 | A | 11/1983 | Finkle |
| 4,917,362 | A | 4/1990 | Wilson |
| 5,056,731 | A | 10/1991 | Koehn |
| 5,106,056 | A | 4/1992 | Crates et al. |
| 5,423,516 | A | 6/1995 | Blaha |
| 5,505,432 | A | 4/1996 | Noonan |
| 5,609,311 | A | 3/1997 | Palm |
| 5,649,674 | A * | 7/1997 | Cielker ............ B65H 75/364 242/396.8 |
| 6,361,021 | B1 | 3/2002 | Brennan |
| 6,416,040 | B1 | 7/2002 | Bergman |
| 6,513,791 | B1 | 2/2003 | Yates |
| 6,598,860 | B2 | 7/2003 | Poole |
| 6,722,603 | B1 * | 4/2004 | Atencio ............ B65H 75/406 242/390.8 |
| 7,025,333 | B1 | 4/2006 | Gianturco |
| 7,100,900 | B2 | 9/2006 | Radle et al. |
| 7,150,448 | B1 | 12/2006 | Swift |
| 8,496,229 | B1 * | 7/2013 | Mayhall ............ B65H 75/406 254/134.3 FT |
| 8,651,459 | B2 | 2/2014 | Axon et al. |
| 8,695,944 | B2 | 4/2014 | Riggins |
| 9,417,054 | B2 | 8/2016 | Moffatt et al. |
| 9,419,418 | B2 | 8/2016 | Passoni |
| 2002/0145029 | A1 | 10/2002 | Konen et al. |
| 2005/0062028 | A1 * | 3/2005 | Konen ............ H02G 11/02 254/134.3 FT |
| 2012/0168699 | A1 | 7/2012 | Rachminov et al. |
| 2014/0001306 | A1 | 1/2014 | Noumi et al. |
| 2015/0184469 | A1 | 7/2015 | Sherman |
| 2016/0096705 | A1 | 4/2016 | Ryals |
| 2019/0292005 | A1 | 9/2019 | Miller et al. |
| 2019/0375606 | A1 | 12/2019 | O'Neal |
| 2021/0126438 | A1 | 4/2021 | Bowles |
| 2021/0163255 | A1 | 6/2021 | Miller et al. |
| 2021/0300712 | A1 | 9/2021 | Kosturko et al. |

FOREIGN PATENT DOCUMENTS

| | | |
|---|---|---|
| KR | 1020140130624 A | 11/2014 |
| WO | 2005013668 A2 | 2/2005 |
| WO | 2005014451 A2 | 2/2005 |
| WO | 2006122129 A2 | 11/2006 |
| WO | 2010111801 A2 | 10/2010 |

OTHER PUBLICATIONS

International Search Report and Written Opinion for Application No. PCT/US2020/027904 dated Jul. 20, 2020 (10 pages).
International Preliminary Report on Patentability for Application No. PCT/US2019/023517 dated Oct. 8, 2020 (13 pages).
Partial Supplementary European Search Report for Application No. 19771753.1 dated Feb. 22, 2022 (13 pages).
Extended European Search Report for Application No. 19771753.1 dated Jul. 6, 2022 (16 pages).

* cited by examiner

FISH TAPE ASSEMBLY

CROSS-REFERENCE TO RELATED APPLICATIONS

This application is a continuation of co-pending U.S. Non-Provisional patent application Ser. No. 16/361,344 filed on Mar. 22, 2019, which claims priority to the following three U.S. Provisional Patent Applications: (1) No. 62/647,201 filed on Mar. 23, 2018; (2) No. 62/732,216, filed on Sep. 17, 2018; and (3) 62/774,707, filed on Dec. 3, 2018. The contents of the all the above-noted applications are incorporated herein by reference.

FIELD OF THE INVENTION

The present invention relates to fish tape assemblies, and more particularly to fish tape tools and fish tape drums for use with fish tape tools.

SUMMARY OF THE INVENTION

The invention provides, in one aspect, a fish tape tool comprising a housing, a chamber defined in the housing and a motor supported by the housing. The motor is configured to rotate in a first direction and a second direction that is opposite the first direction. The fish tape tool further comprises an output reel disposed in the chamber and rotatable in response to receiving torque from the motor and a drum containing a fish tape and including a rotatable drum portion having an inner wall that is engaged by the output reel when the drum is inserted into the chamber of the housing. When the drum is in the chamber and the motor is rotated in the first direction, the drum portion is rotated by the output reel in the first direction, such that the fish tape is dispensed from the drum. When the drum is in the chamber and the motor is rotated in the second direction, the drum portion is rotated by the output reel in the second direction, such that the fish tape is retracted into the drum.

The invention provides, in another aspect, a power tool comprising a housing and a motor supported by the housing. The motor is configured to rotate in a first direction and a second direction that is opposite the first direction. The power tool further comprises a battery for supplying power to the motor and a drum containing a fish tape and including a rotatable drum portion configured to receive torque from the motor. When the motor is rotated in the first direction, the drum portion is rotated by the motor in the first direction, such that the fish tape is dispensed from the drum. When the motor is rotated in a second direction, the drum portion is rotated by the motor in the second direction, such that the fish tape is retracted into the drum.

The invention provides, in yet another aspect, a power tool comprising a housing, a chamber defined in the housing, a motor supported by the housing, and a drum configured to be inserted into the chamber of the housing. The drum contains a fish tape and includes a rotatable drum portion configured to rotate in response to receiving torque from the motor. The drum is one of a plurality of drums that are insertable into and removable from the chamber of the housing. Each drum contains a different type of fish tape.

The invention provides, in yet another aspect, a power tool comprising a housing, a first motor supported by the housing, a second motor supported by the housing, a drive roller configured to receive torque from the second motor, an idler roller arranged proximate the drive roller, and a drum containing a fish tape and including a rotatable drum portion configured to receive torque from the first motor. A portion of the fish tape is wedged between the drive roller and the idler roller. When the first motor is rotated in a first direction, the drum portion is rotated by the first motor in the first direction, such that the fish tape is retracted into the drum. When the second motor is rotated in a second direction that is opposite the first direction, the drive roller is rotated in the second direction such that the fish tape is moved between the drive roller and the idler roller to dispense the fish tape from the drum.

The invention provides, in yet another aspect, a power tool comprising a housing, a motor supported by the housing, a drive roller configured to receive torque from the motor, an idler roller arranged proximate the drive roller, and a drum containing a fish tape and including a rotatable drum portion configured to receive torque from the first motor. A portion of the fish tape is wedged between the drive roller and the idler roller. When the motor is rotated in a first direction, the drum portion is rotated by the motor in the first direction, such that the fish tape is retracted into the drum. When the motor is rotated in a second direction that is opposite the first direction, the drive roller is rotated in the second direction, such that the fish tape is moved between the drive roller and the idler roller to dispense the fish tape from the drum.

The invention provides, in yet another aspect, a power tool comprising a housing, a motor supported by the housing, a drive roller, an idler roller arranged proximate the drive roller; and a drum containing a fish tape and including a rotatable drum portion configured to receive torque from the motor. A portion of the fish tape is wedged between the drive roller and the idler roller. The drum portion includes an outer ring gear that is engaged with the drive roller. When the motor is rotated in a first direction, the drum portion is rotated by the motor in the first direction such that the fish tape is retracted into the drum. When the motor is rotated in a second direction that is opposite the first direction, the drum portion is rotated by the motor in the second direction and the drive roller is rotated by the ring gear in the second direction, such that the fish tape is moved between the drive roller and the idler roller to dispense the fish tape from the drum.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
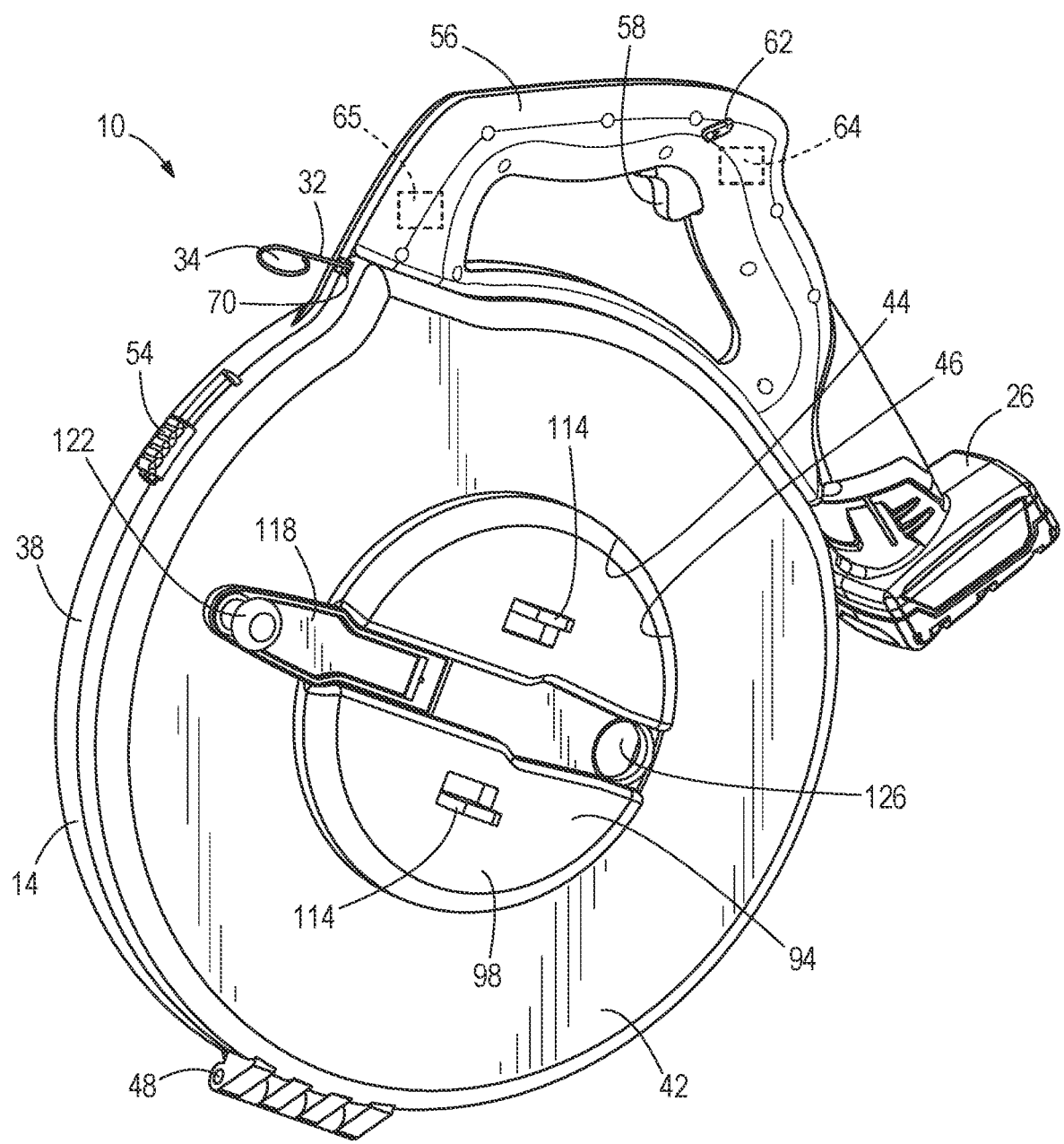
FIG. 1 is perspective view of a fish tape assembly.
Figure 2:
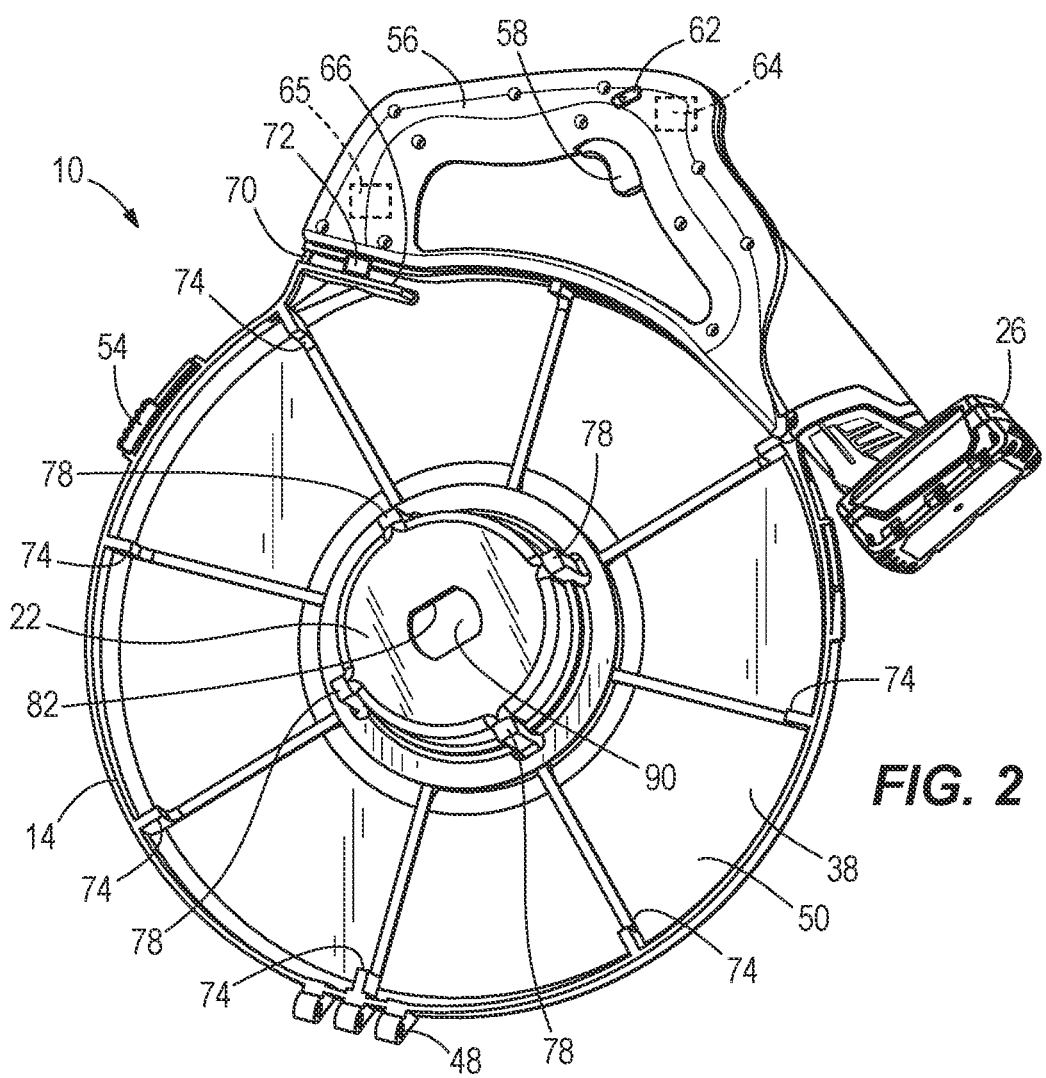
FIG. 2 is a perspective view of the fish tape assembly of FIG. 1, with portions removed.
Figure 3:
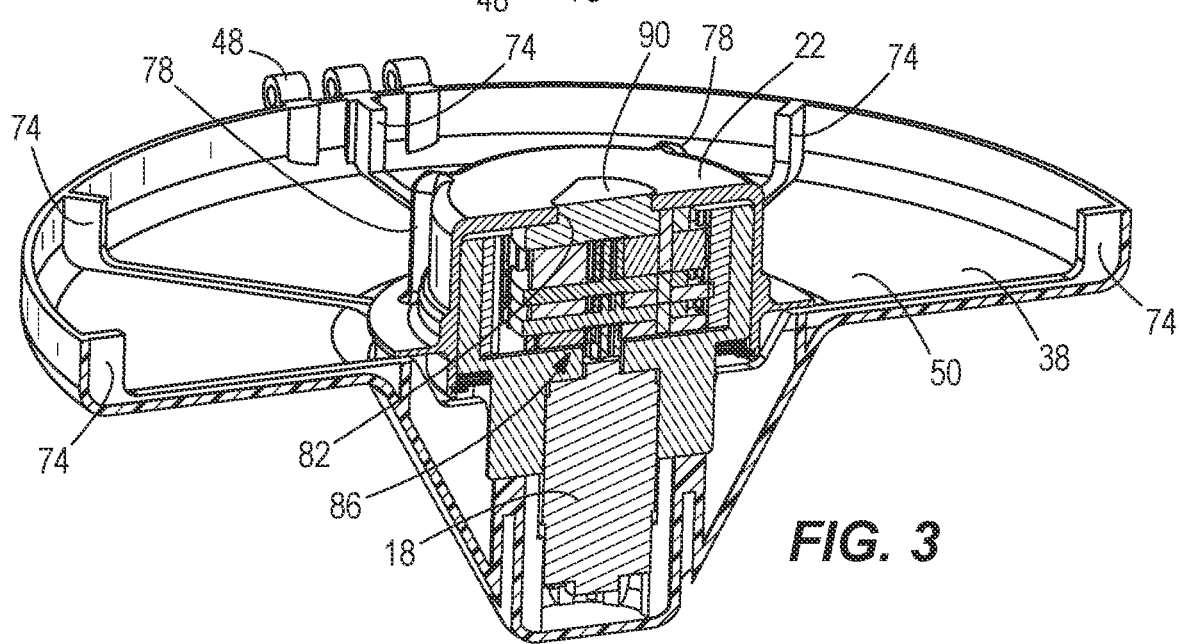
FIG. 3 is a cross-sectional view of the fish tape assembly of FIG. 1, with portions removed.

As shown in FIGS. 1-3, a fish tape assembly includes a fish tape tool 10 having a housing 14, a motor 18 (FIG. 3) for driving an output reel 22 (FIG. 2), and a selectively removable and rechargeable battery 26 for powering the motor 18. The fish tape tool 10 receives a fish tape drum 30 (FIG. 6) that contains a length of fish tape 32 having a moving end 34 extending out of the fish tape drum 30 and the fish tape tool 10. As explained further below, when the fish tape drum 30 is received in the fish tape tool 10, the output reel 22 can rotate to move the moving end 34 out of or into the housing 14.

As shown in FIGS. 1 and 2, the housing 14 includes a base 38 and a door 42 having an inner edge 44 defining an aperture 46. The door 42 is pivotably coupled to the base 38 via a hinge joint 48. An interior chamber 50 is defined within the housing 14. The door 42 moves with respect to the base 38 between a closed position (FIG. 1), in which the interior chamber 50 is not accessible, and an open position, in which the interior chamber 50 is accessible. The open position is shown in FIG. 2, with the door 42 removed for clarity, and in FIGS. 12 and 13. A latch 54 on the base 38 is slideable between a locked position, in which the door 42 is locked in the closed position, and an unlocked position, in which the door 42 may be pivoted to the open position.

With continued reference to FIGS. 1 and 2, the housing 14 includes a handle 56 coupled to the base 38. The handle 56 includes a trigger 58 for actuating the motor 18 and a directional shuttle 62 that can slide between a dispensing position and a retracting position. In the dispensing position, the motor 18 and the output reel 22 rotate in a dispensing direction, such that the fish tape 32 is dispensed from the fish tape drum 30 (and tool 10). In the retracting position, the motor 18 and the output reel 22 rotate in a retracting direction that is opposite the dispensing direction, such that the fish tape 32 is retracted into the fish tape drum 30 (and tool 10). The handle 56 includes a light 64, such as an LED, that is illuminated when the trigger is depressed 58 to actuate the motor 18.

The fish tape tool 10 also includes a controller 65 for variably controlling the speed of the motor 18, and thus the speed at which the fish tape 32 is dispensed or retracted. In some embodiments, the controller varies the speed of the motor 18 in response to a degree of depression of the trigger. In some embodiments, the controller 65 varies the speed of the motor 18 based on pulse width modulation. In some embodiments, the fish tape tool 10 includes a potentiometer (not shown) to vary the speed of the motor 18.

Figure 9:
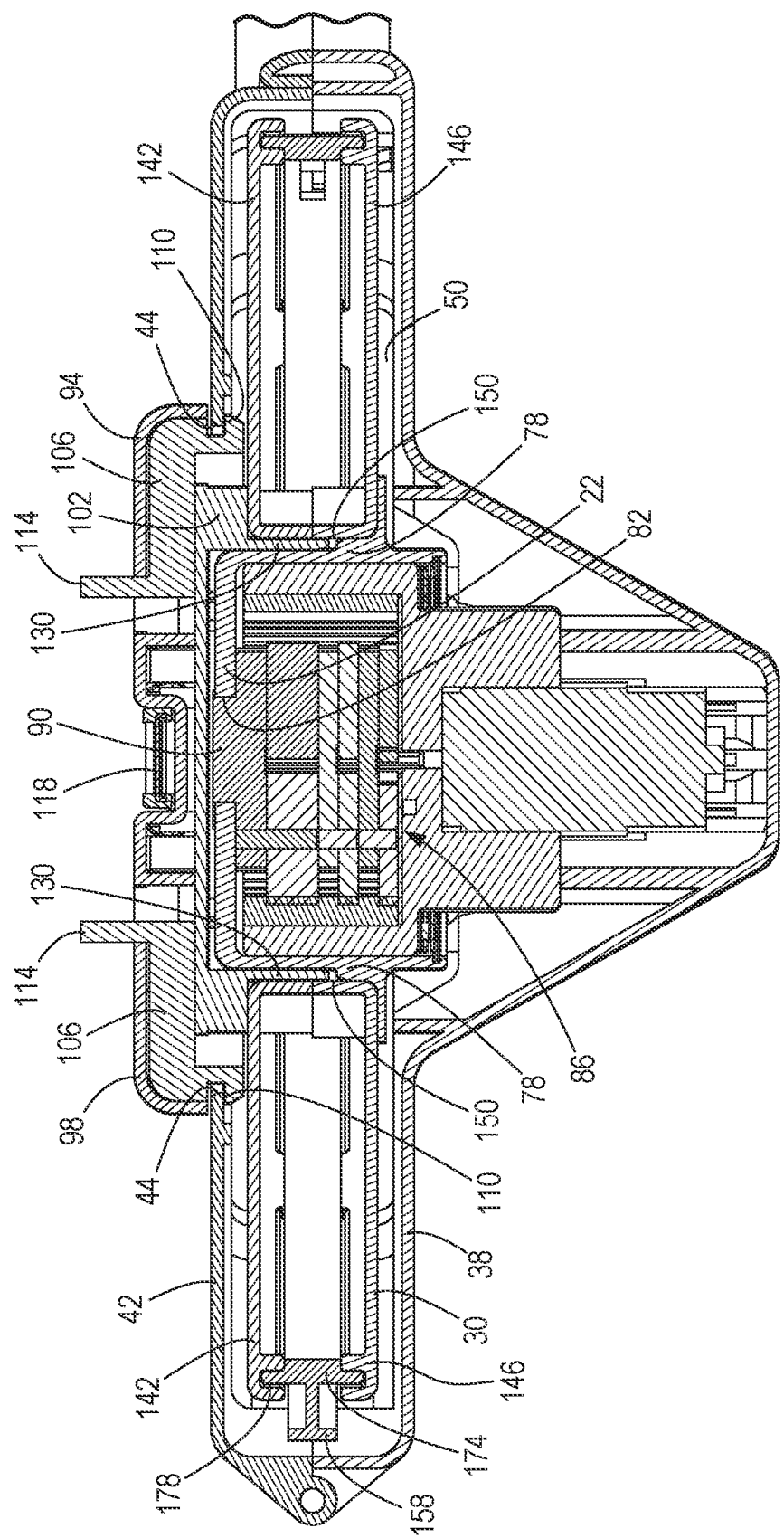
FIG. 9 is a cross-sectional view of the fish tape assembly of FIG. 1, with the fish tape drum of FIG. 6 inserted.

As shown in FIG. 2, the base 38 includes a channel 66 leading from the interior chamber 50 to an exit 70 out of the housing 14. The channel 66 includes a hall effect sensor 72, whose function will be described later herein. The base 38 also includes radially inward-extending ribs 74. With continued reference to FIG. 2, the output reel 22 includes radially outward-extending legs 78 and a keyway recess 82. As shown in FIGS. 3 and 9, the fish tape tool 10 includes a transmission 86 for transferring torque from the motor 18 to the output reel 22. The transmission 86 terminates in a drive key 90 arranged in the keyway recess 82, such that the output reel 22 can receive torque from the transmission 86, and thus rotate relative to the base 38. In some embodiments the transmission 86 includes a clutch mechanism (not shown). As explained in further detail below, the clutch mechanism is used to disconnect the output reel 22 from the transmission 86, such that torque cannot be transferred from the output reel 22 to the transmission 86.

Figure 4:
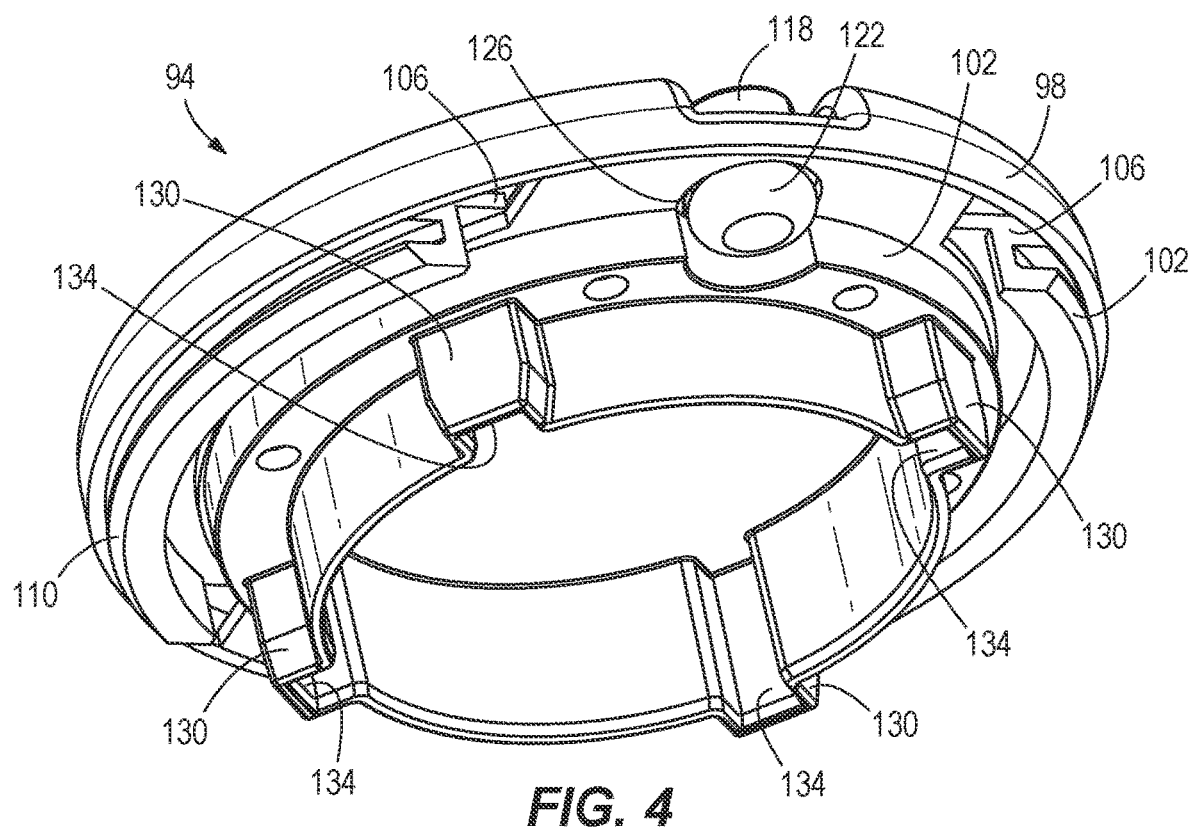
FIG. 4 is a bottom perspective view of a crank hub of the fish tape assembly of FIG. 1.
Figure 5:
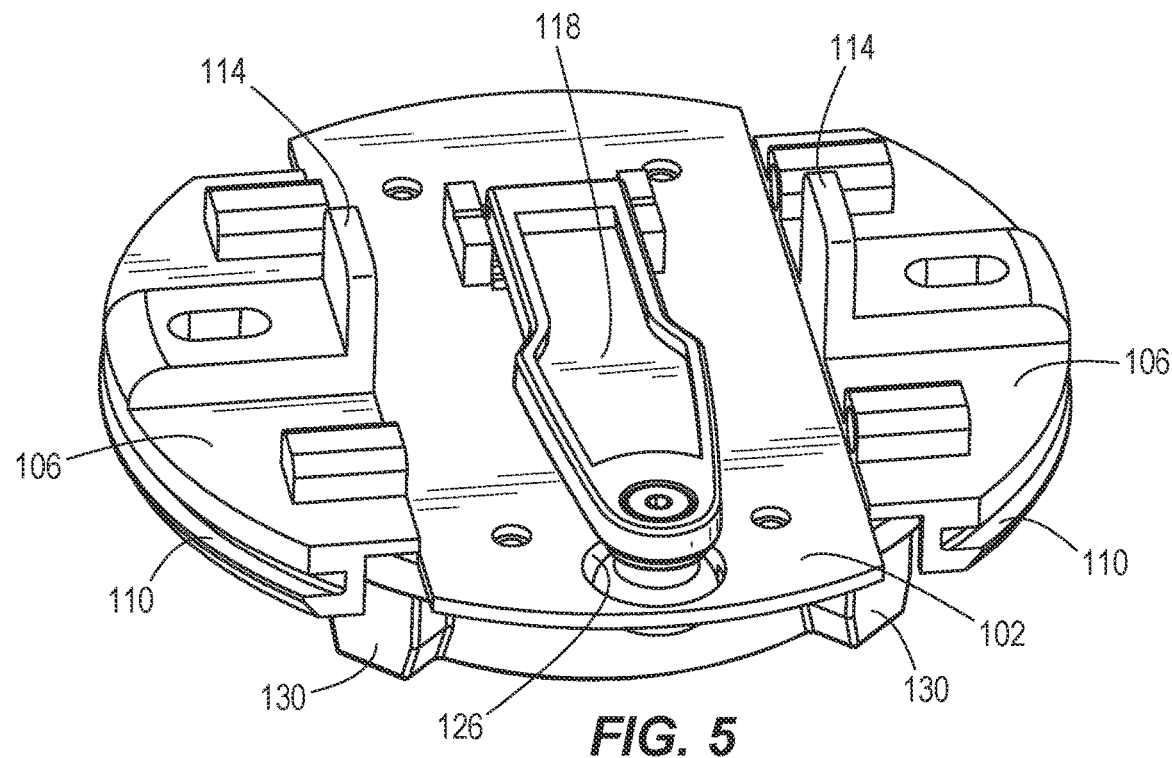
FIG. 5 is a top perspective view of a crank hub of the fish tape assembly of FIG. 1, with an outer shelf removed.

As shown in FIGS. 1, 4, and 5, the fish tape tool 10 includes a crank hub 94 including an outer shelf 98, an inner shelf 102, and a pair of detent members 106 between the outer and inner shelves 98, 102. The detent members 106 each include a radially outward-extending lip 110 and an axially extending tab 114. The detent members 106 are moveable between radially inward and outward positions, as explained in further detail below.

The outer shelf 98 includes a lever 118 moveable between an extended position shown in FIG. 1 and a collapsed position shown in FIG. 5. The lever 118 includes a detent 122 that is receivable in a recess 126 extending through the outer and inner shelves 98, 102, such that when the lever 118 is moved to the collapsed position of FIG. 5, the lever 118 is locked against the crank hub 94 unless an operator pulls the detent 122 out of the recess 126. As shown in FIG. 4, the inner shelf 102 includes radially outward-extending legs 130 in which radially outward-extending recesses 134 are defined on each leg 130. Thus, the crank hub 94 may be engaged for rotation with the output reel 22 by setting the legs 78 of the output reel 22 within the recesses 134 of the crank hub 94.

Figure 6:
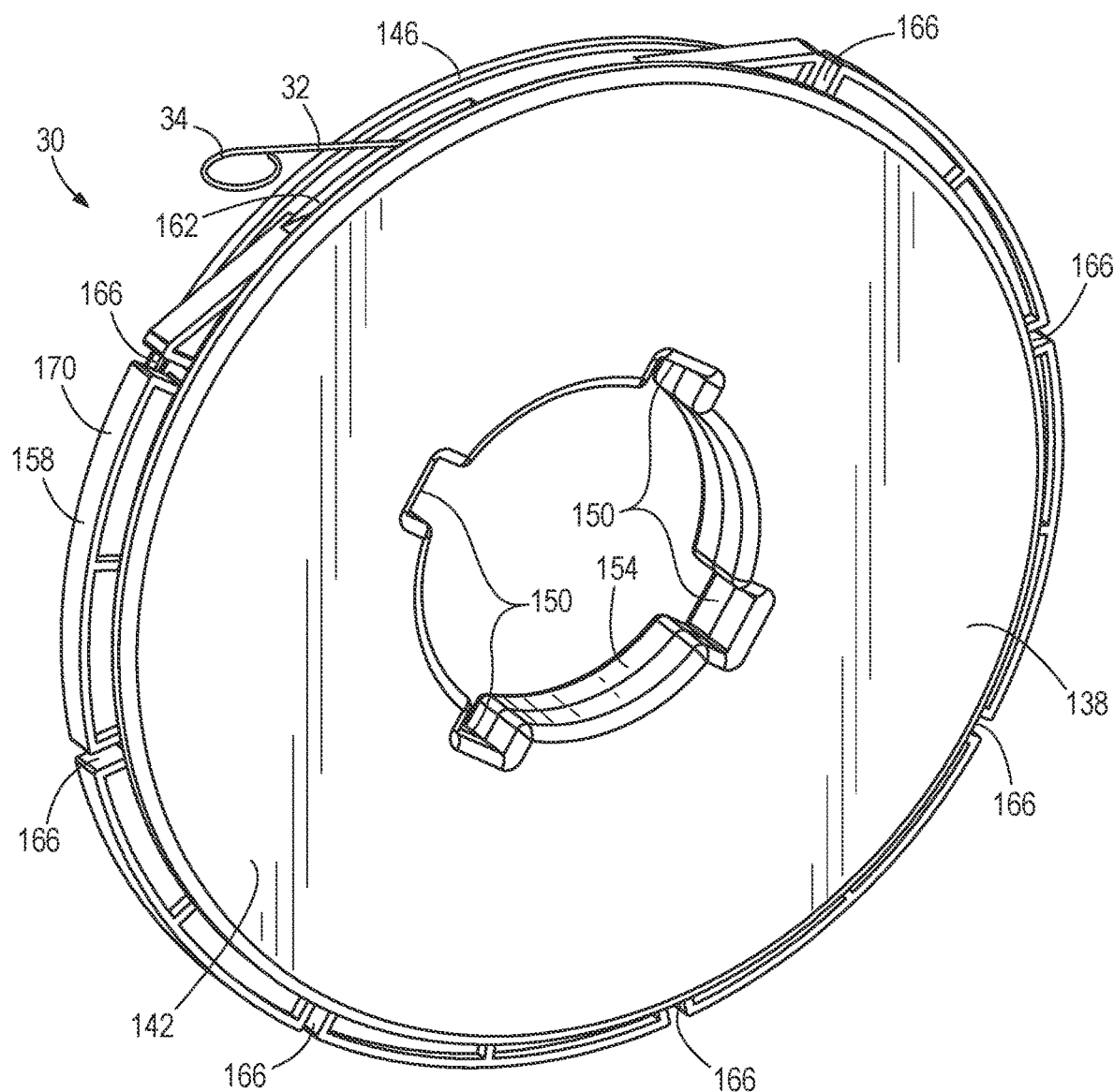
FIG. 6 is a perspective view of a fish tape drum of the fish tape assembly of FIG. 1.

As shown in FIG. 6, the fish tape drum 30 includes a drum portion 138 including first and second clamshells 142, 146. The drum portion 138 retains the length of fish tape 32 and defines radially outward-extending recesses 150 at an inner diameter 154 thereof. A frame 158 is arranged between the first and second clamshells 142, 146 of the drum portion 138 and defines an exit 162 for the fish tape 32. The frame 158 also defines radially inward-extending recesses 166 at an outer edge 170 thereof. As explained in further detail below, the drum portion 138 is rotatable relative to the frame 158.

This fish tape 32 includes an anchor end (not shown) that is opposite of the moving end 34. The anchor end of the fish tape 32 is anchored within the drum portion 138 of the fish tape drum 30. In some embodiments, the anchor end of the fish tape 32 is anchored within the fish tape drum 30 at the inner diameter 154 of the drum portion 138 by a screw boss (not shown). Proximate the anchor end, the length of fish tape 32 includes a detectable element, such as a magnet (not shown) that is detectable by the hall effect sensor 72 in the channel 66. Thus, during a dispensing operation, when a predetermined amount of fish tape 32 has been dispensed out from the fish tape tool 10, the magnet passes by the hall effect sensor 72, which sends a signal to the controller 65. In response to the signal, the controller 65 determines that the predetermined amount of fish tape 32 has been dispensed out of the fish tape tool, and alerts the operator, e.g. via a different color or flashing pattern from the light 64, that the predetermined amount of fish tape 32 has been dispensed.

Figure 7:
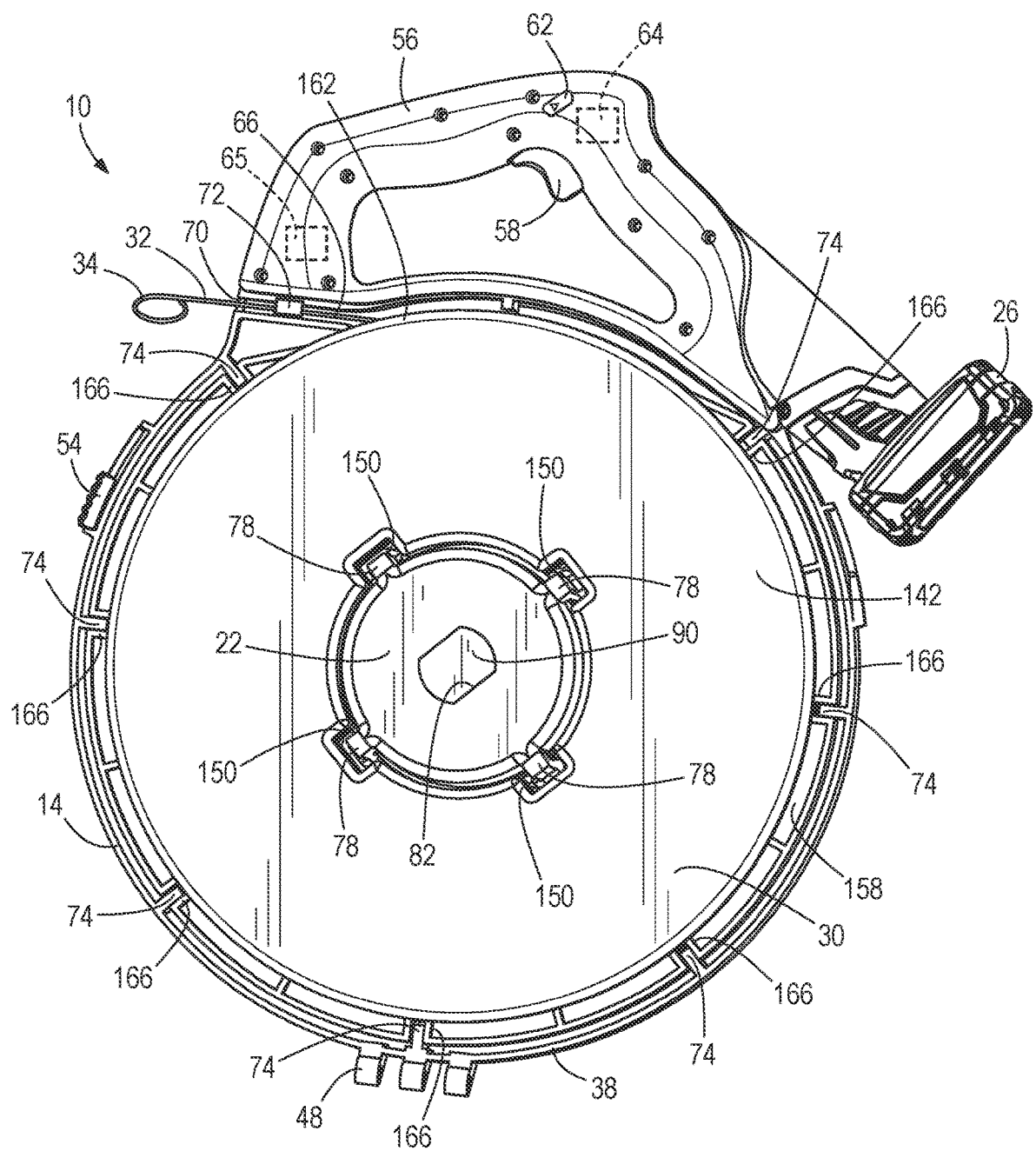
FIG. 7 is a plan view of the fish tape assembly of FIG. 1, with a door and a crank hub removed and the fish tape drum of FIG. 6 inserted.
Figure 8:
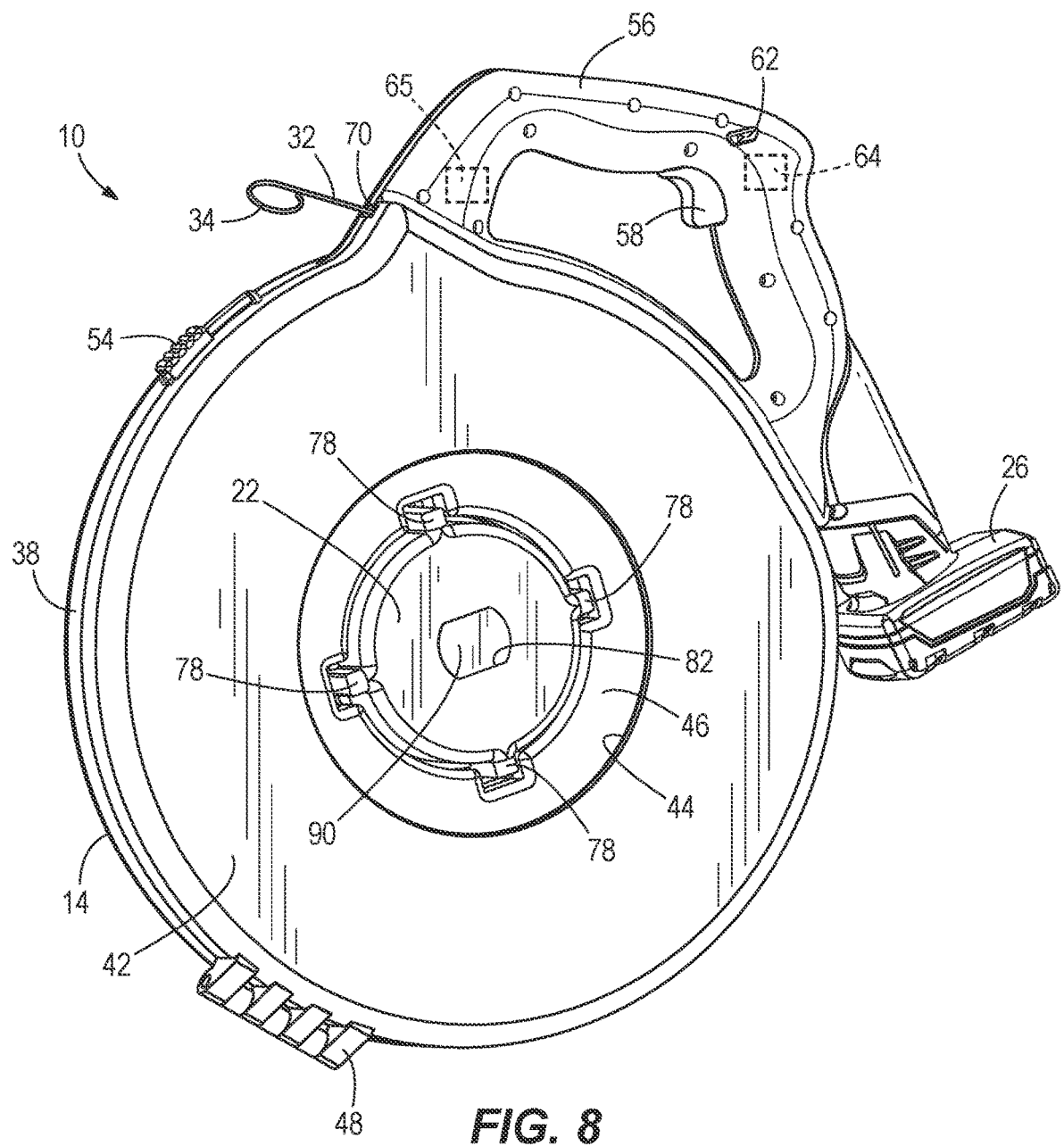
FIG. 8 is a perspective view of the fish tape assembly of FIG. 1, with the fish tape drum of FIG. 6 inserted and a crank hub removed.

To install the fish tape drum 30 in the fish tape tool 10, an operator slides the latch 54 to the unlocked position and then pivots the door 42 to the open position, as shown in FIG. 2. The operator then inserts the fish tape drum 30 into the interior chamber 50, aligning the exit 162 of the frame 158 with the channel 66 of the base 38 and the ribs 74 with the recesses 166 of the frame 158, as shown in FIG. 7. Thus, the frame 158 of the fish tape drum 30 is prevented from rotating with respect to the base 38. The operator then positions the fish tape 32 in the channel 66 and arranges the moving end 34 outside of the exit 70 of the housing 14, as shown in FIG. 7. The operator then closes the door 42 and moves the latch 54 to the locked position, thereby securing the fish tape drum 30 within the internal chamber 50 of the housing 14, as shown in FIG. 8. In some embodiments, the operator may now operate the fish tape tool 10 to dispense fish tape 32 from the housing 14 without insertion of the crank hub 94, because the legs 78 of the output reel 22 are positioned within the recesses 150 of the drum portion 138 of the fish tape drum 30. However, the subsequent operation described below will include insertion of the crank hub 94 into the housing 14 and operation therewith.

To insert the crank hub 94 into the housing 14, the operator pushes the tabs 114 of the detent members 106 of the crank member 94 radially inward, causing the detent members 106 to be held in a radially inward position (FIG. 9). The crank hub 94 may then be inserted through the aperture 46 of the door 42, in an alignment whereby the legs 78 of the reel output 22 are arranged in the recesses 134 of inner shelf 102 of the crank hub 94, and the legs 130 of the inner shelf 102 are received in the recesses 150 of the drum portion 138. Thus, the crank hub 94 is locked for rotation with the output reel 22 and the drum portion 138 is locked for rotation with the crank hub 94. Once the crank hub 94 has been inserted, the operator moves the tabs 114 outward, causing the detent members 106 to move to a radially outward position, such that the lips 110 are captured underneath the edge 44 of the door 42, as shown in FIG. 9. Thus, the crank hub 94 is axially locked with respect to the housing 14, and now prevented from slipping out of the aperture 46.

With continued reference to FIG. 9, the drum portion 138 is rotatable relative to the frame 150 by virtue of an inner edge 174 of the frame 158 being positioned within a channel 178 defined between the first and second clamshells 142, 146 of the drum portion 138. The length of fish tape 32 stored in the drum portion 138 has been omitted from FIG. 9 for clarity.

With the fish tape drum 30 and the crank hub 94 secured in the housing 14, the operator may now operate the fish tape tool 10. The operator slides the shuttle 62 to the dispensing position and depresses the trigger 58, thereby actuating the motor 18. The transmission 86 transmits torque from the motor 18 to the reel output 22 via the drive key 90 in the keyway recess 82. Because the legs 78 of the output reel 22 are arranged in the recesses 134 of the crank hub 94, and the legs 130 of the crank hub 94 are received in the recesses 150 of the drum portion 138, the crank hub 94 transmits rotation from the output reel 22 to the drum portion 138. As the drum portion 138 of the fish tape drum 30 rotates, the moving end 34 of the fish tape 32 is forced to move away from tool 10 and through, e.g., a conduit or wall.

As described above, if the operator completely depresses the trigger 58, the controller 65 causes the motor 18, and thus the fish tape 32, to move at a first, maximum speed. If the operator partially depresses the trigger 58, the controller 65 causes the motor 18, and thus the fish tape 32, to move a second speed that is slower than the first speed. While the operator is depressing the trigger 58 and the fish tape 32 is being dispensed, the light 64 is illuminated to indicate to the operator that fish tape is being dispensed. When the predetermined amount of fish tape 32 has been dispensed out from the fish tape tool 10, the magnet on the fish tape 32 passes by the hall effect sensor 72, which sends a signal to the controller 65. In response to the signal, the controller 65 alerts, e.g. via the light 64, the operator that the predetermined amount of fish tape 32 has been dispensed. With this notification, the operator releases the trigger 58, thus stopping the motor 18.

In order to retract the fish tape 32 back into the tool 10 and fish tape drum 30, the operator may slide the shuttle 62 to the retracting position, thus switching the rotational direction of motor 18 and fish tape drum 30, and operate the motor 18 to reel in the fish tape 32 by depressing the trigger 58. At some point during retraction, it is possible that the fish tape 32 may become entangled within a conduit or wall, or the moving end 34 may become caught or snagged. To prevent damage to the motor 18 and transmission 86, the controller 65 is capable of determining that the fish tape 32 has become entangled or snagged and in response, deactivates the motor 18. In some embodiments, the controller 65 monitors the current drawn by the motor 18 from the battery 26 during operation. If and when the fish tape 32 becomes snagged or entangled, the amount of current that the motor 18 draws will be above a predetermined threshold. The controller 65 detects that the current drawn is above the predetermined threshold, and in response deactivate the motor 18.

Instead of powered retraction, as some point the operator may switch the lever 118 to the extended position, as shown in FIG. 1, and crank the fish tape 32 back into the tool 10 manually, via the crank hub 94. Specifically, as the operator rotates the lever 118, and thus the crank hub 94, with respect to the housing 14, the drum portion 138 of the fish tape drum 30 is also caused to rotate because the legs 130 of the crank hub 94 are locked in the recesses 150 of the drum portion 138. Rotation of the crank hub 94 also causes rotation of the output reel 22, because the legs 78 of the output reel 22 are arranged in the recesses 134 of the crank hub 94. In the illustrated embodiment, the lever 118 is used to overcome the cogging torque of the motor 18. In other words, as the crank hub 94 is manually rotated, the output reel 22 rotates and transfers torque back through the transmission 86.

In other embodiments, however, a clutch mechanism is included to decouple the output reel 22 from the transmission 86, allowing the output reel 22 to spin freely with respect to the transmission 86 when the crank hub 94 manually rotates the output reel 22. Thus, in embodiments with a clutch, torque is not transmitted back from the output reel 22 to the transmission 86 as the operator manually cranks the crank hub 94 with the lever 118. For instance, upon the lever 118 being moved to the extended position, the crank hub 94 may push the key 90 out of the keyway recess 82, such that the output reel 22 may rotate relative to the transmission 86 when it receives torque from manual rotation of the crank hub 94. Though manual operation of the tool 10 via the crank hub 94 is described here with respect to retracting the fish tape 32 into the tool 10, manual operation via the crank hub 94 can also be used to dispense fish tape 32 from the tool 10.

Once the fish tape 32 has been retracted into the tool 10, the operator may need to use a new fish tape drum 30 with a new type of fish tape 32 that is different from the current fish tape 32. For instance, the operator may need to change between conductive and non-conductive fish tape 32. Thus, the operator must remove the currently-installed fish tape drum 30.

Figure 10:
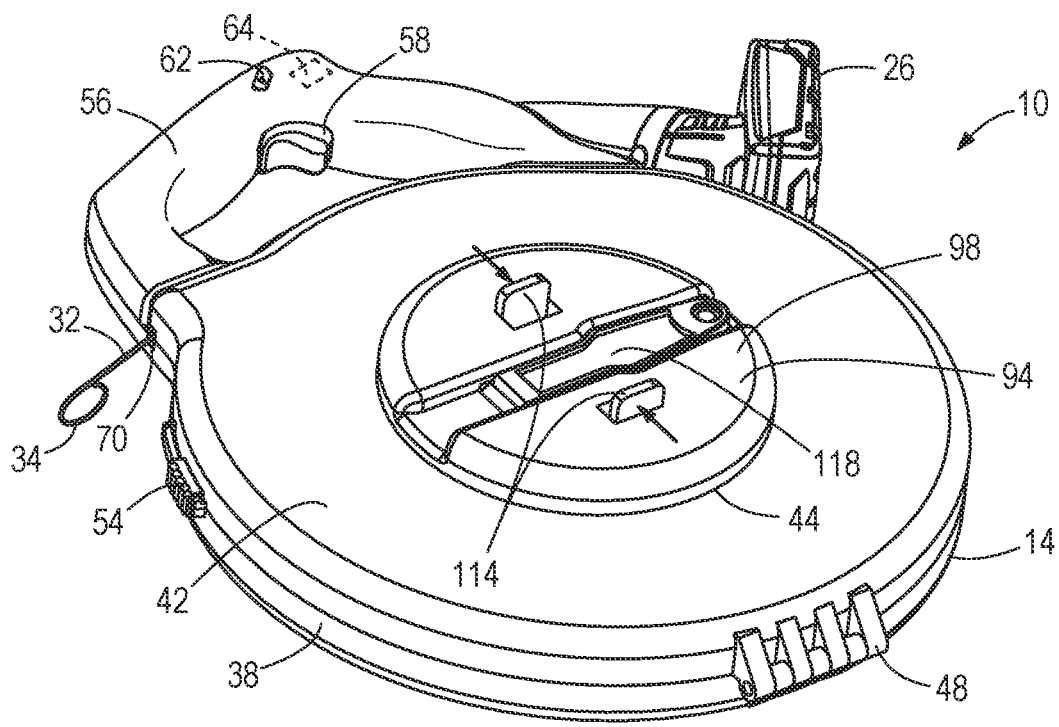
FIG. 10 is a perspective view of the fish tape assembly of FIG. 1, illustrating movement of detent members of a crank hub.
Figure 11:
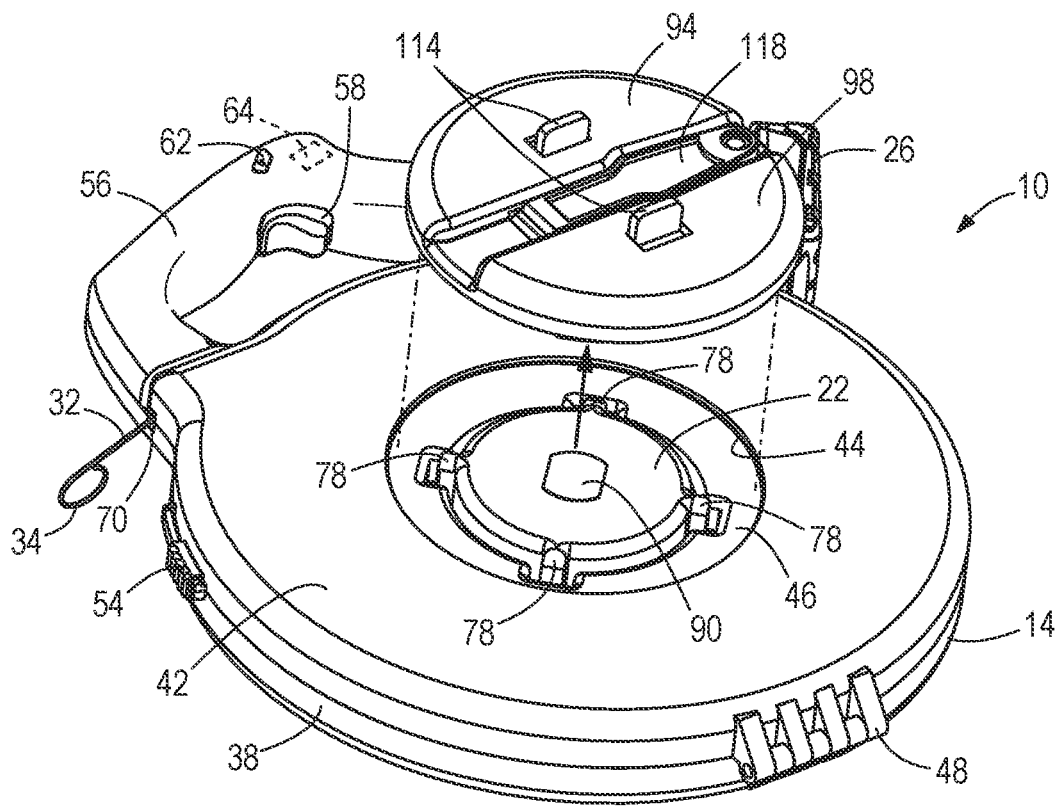
FIG. 11 is a perspective view of the fish tape assembly of FIG. 1, illustrating removal of a crank hub.
Figure 12:
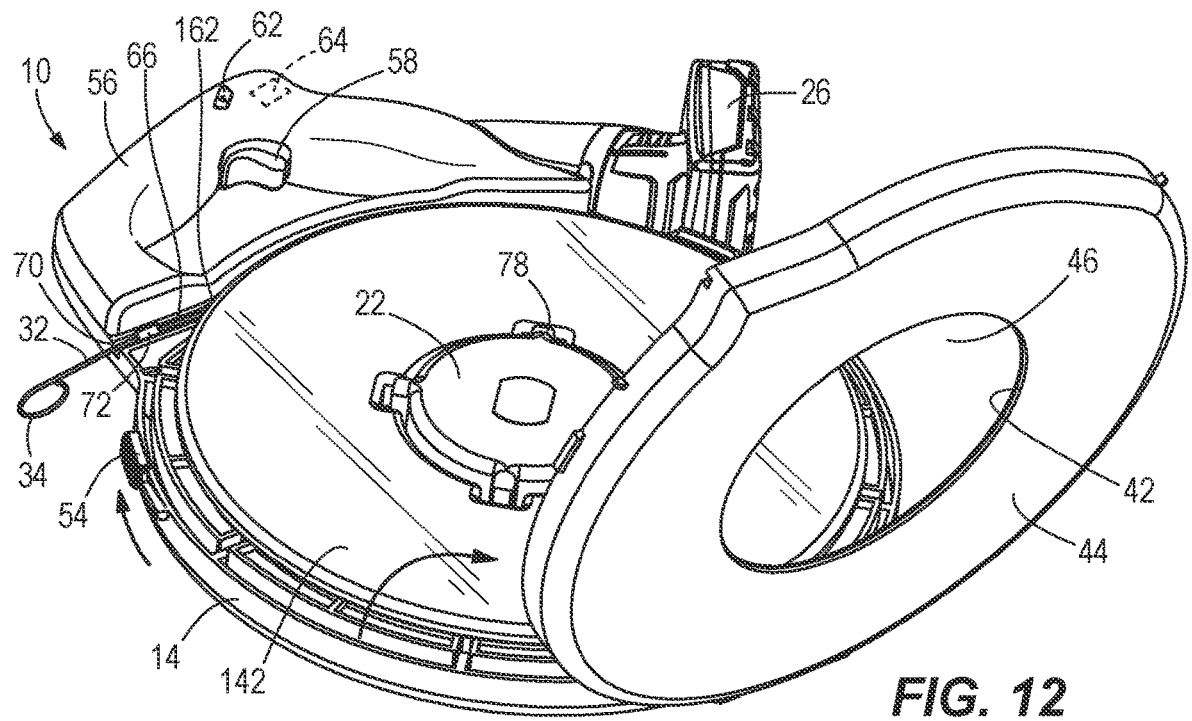
FIG. 12 is a perspective view of the fish tape assembly of FIG. 1, illustrating opening of a door.
Figure 13:
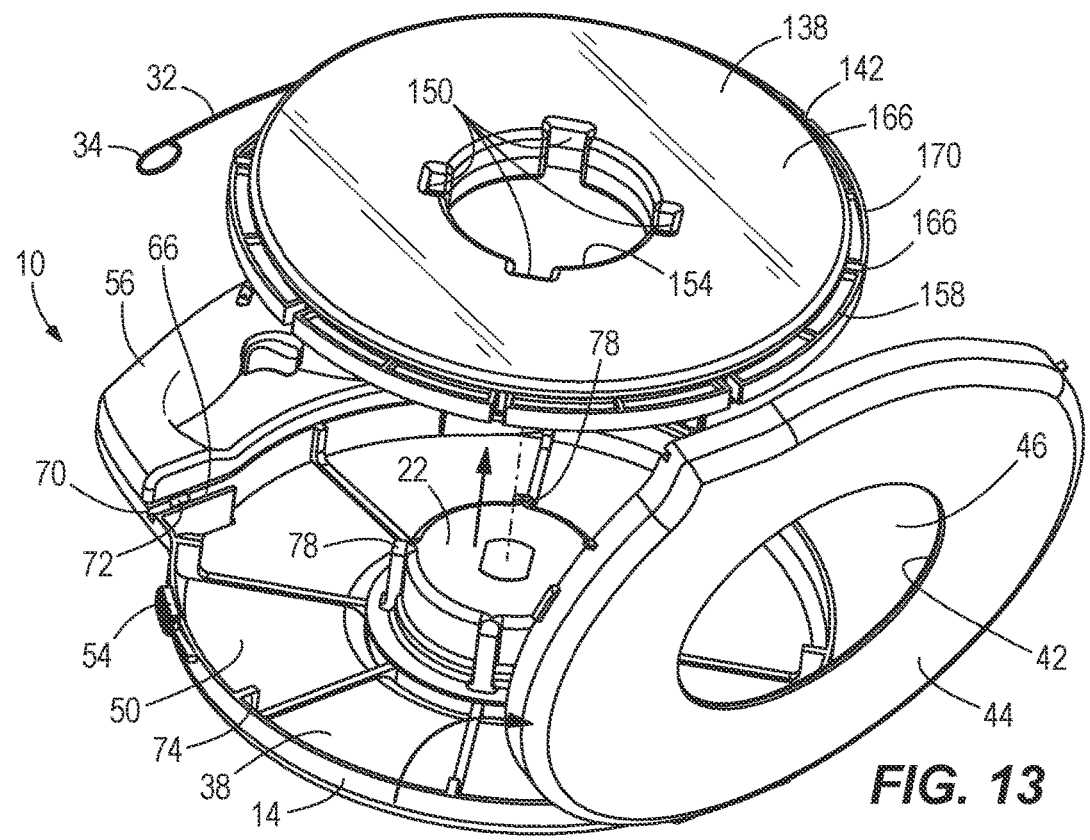
FIG. 13 is a perspective view of the fish tape assembly of FIG. 13, illustrating removal of the fish tape drum of FIG. 6.

To remove the fish tape drum 30, the operator moves the tabs 114 of the detent members 106 of the crank hub 94 radially inward, causing the detent members 106 to be held in a radially inward position, as shown in FIG. 10. The lips 110 of the detent members 106 are thus moved radially inward of edge 44, allowing the crank hub 94 to be removed from the aperture 46 of the door 42, as shown in FIG. 11. The latch 54 is then moved to the unlocked position, allowing the door 42 to be moved to the open position, as shown in FIG. 12. The operator is then able to remove the fish tape drum 30, as shown in FIG. 13, and replace it with a different fish tape drum 30, as described above.

FIGS. 14-17, 19, 31 and 33 illustrate a different embodiment of a fish tape drum 182. The fish tape drum 182 includes a drum portion 186 including first and second clamshells 190, 194. The first and second clamshells 190, 194 are each separately and rotatably supported by a frame 202 of the fish tape drum 182. A length of fish tape 196 (omitted in FIGS. 15-17 and FIG. 33 for clarity) is retained between the first and second clamshells 190, 194 of the drum portion 186. Each of the first and second clamshells 190, 194 of the drum portion 186 defines radially outward-extending recesses 198 that serve the same function as the recesses 150 of the drum portion 138 of fish tape drum 30. The first and second clamshells 190, 194 of the drum portion 186 are jointly rotatable relative to the frame 202 in the same manner as the drum portion 138 is rotatable relative to the frame 158 of the fish tape drum 30, as explained above, in order to dispense or retract the fish tape 196 from or into the fish tape drum 182.

Figure 31:
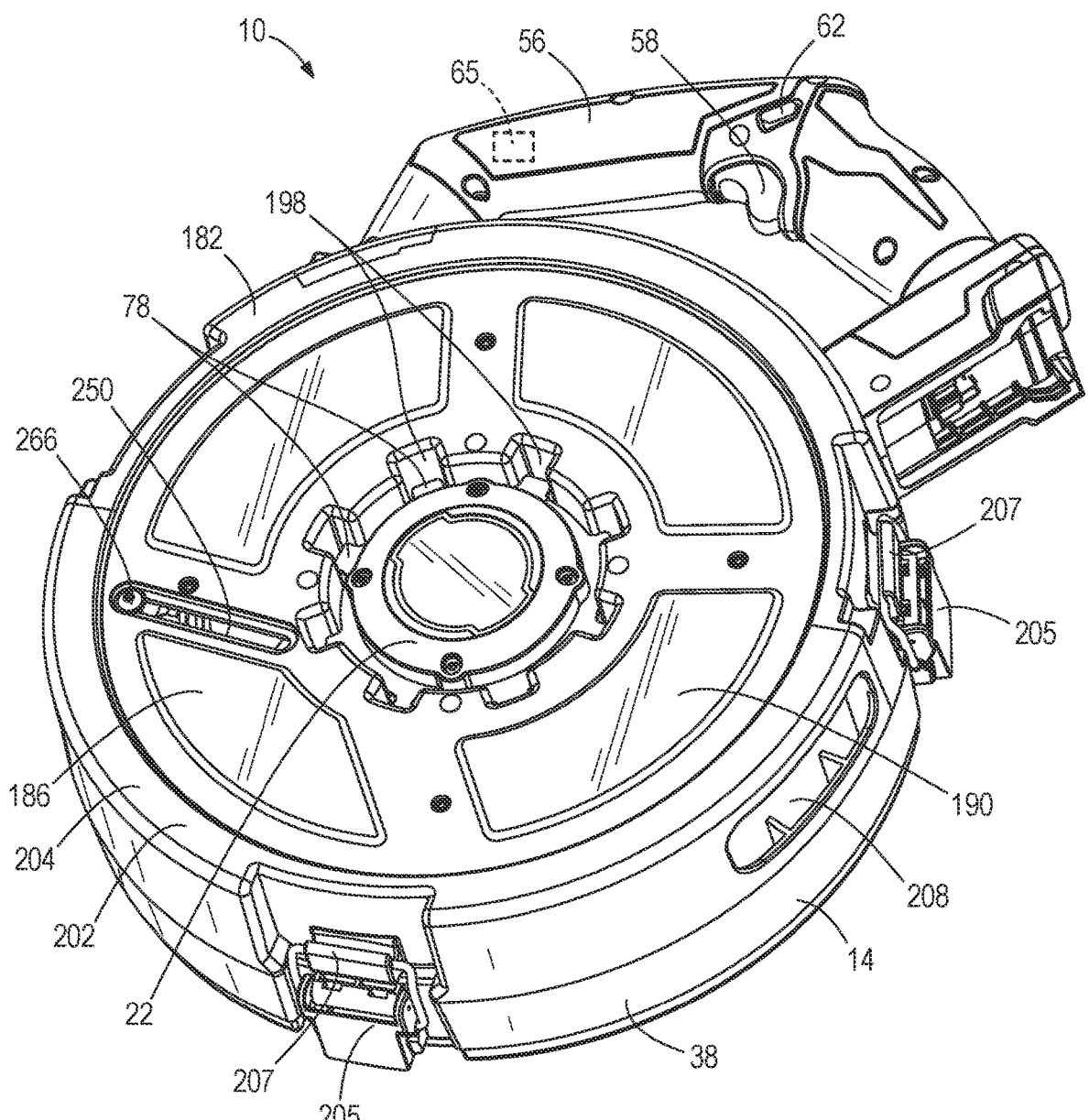
FIG. 31 is a perspective view a fish tape assembly according to another embodiment.
Figure 32:
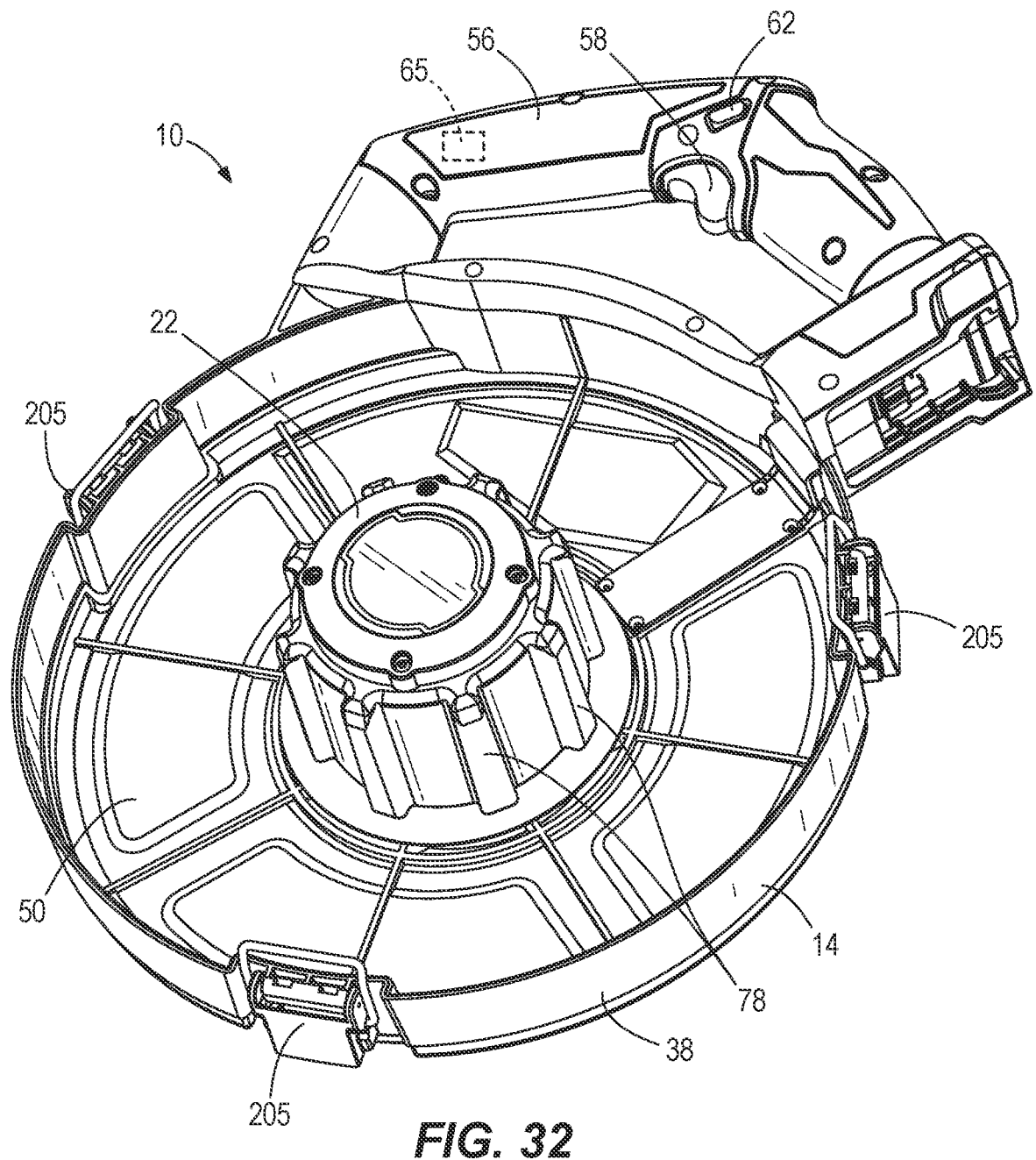
FIG. 32 is a perspective view of the fish tape assembly of FIG. 31, with a fish tape drum removed.
Figure 33:
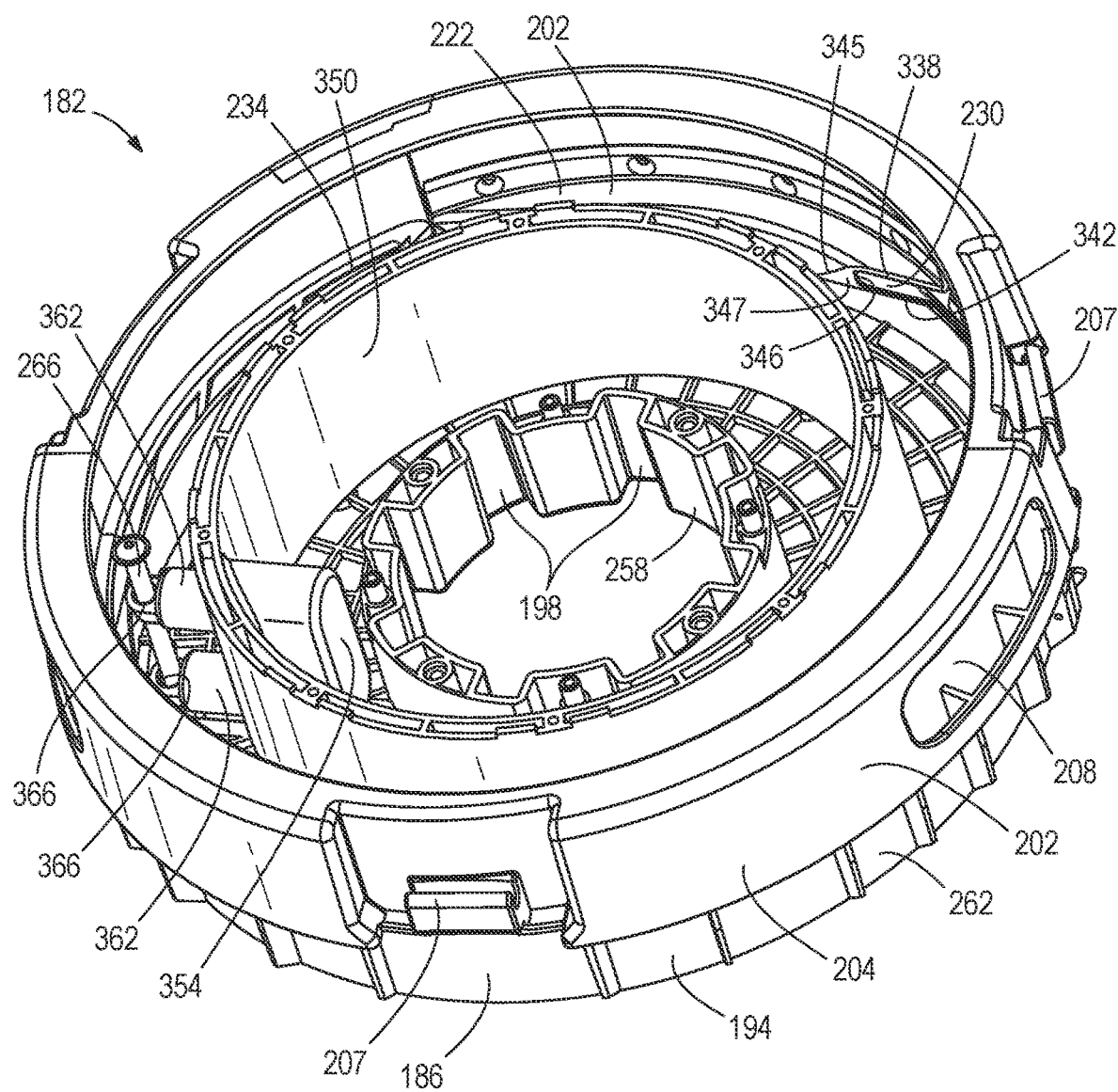
FIG. 33 is a perspective view of a fish tape drum of the fish tape assembly of FIG. 31, with portions removed.

As shown in FIGS. 14, 19 and 31 and 33 the frame 202 may include a shelf portion 204. Thus, in the embodiments of FIGS. 14-17 and 19 and 31-33, the fish tape tool 10 omits door 42 as shown in FIG. 32 and instead, when the fish tape drum 182 is received in the interior chamber 50, the shelf portion 204 of the frame 202 rests on the base 38 of the housing 14 of the tool 10, as shown in FIG. 31. Latches 205 on the fish tape tool 10, such as over-center latches, are used to secure the shelf portion 204 to the base 38 in order to prevent the fish tape drum 182 from slipping out of the base 38. As shown in the embodiment of FIGS. 31-33, the shelf portion 204 includes hooks 207 engagable by the latches 205 and gripping recesses 208 graspable by the operator to insert or remove the fish tape drum 182 into the interior chamber 50 of the fish tape tool 10. Also, in the embodiments of FIGS. 14-17 and 19 and 31-33, the crank hub 94 is omitted and thus, the output reel 22 rotates the drum portion 186 of the fish tape drum 182 directly, via the arrangement of legs 78 of the output reel 22 in the recesses 198 of the drum portion 186.

Figure 14:
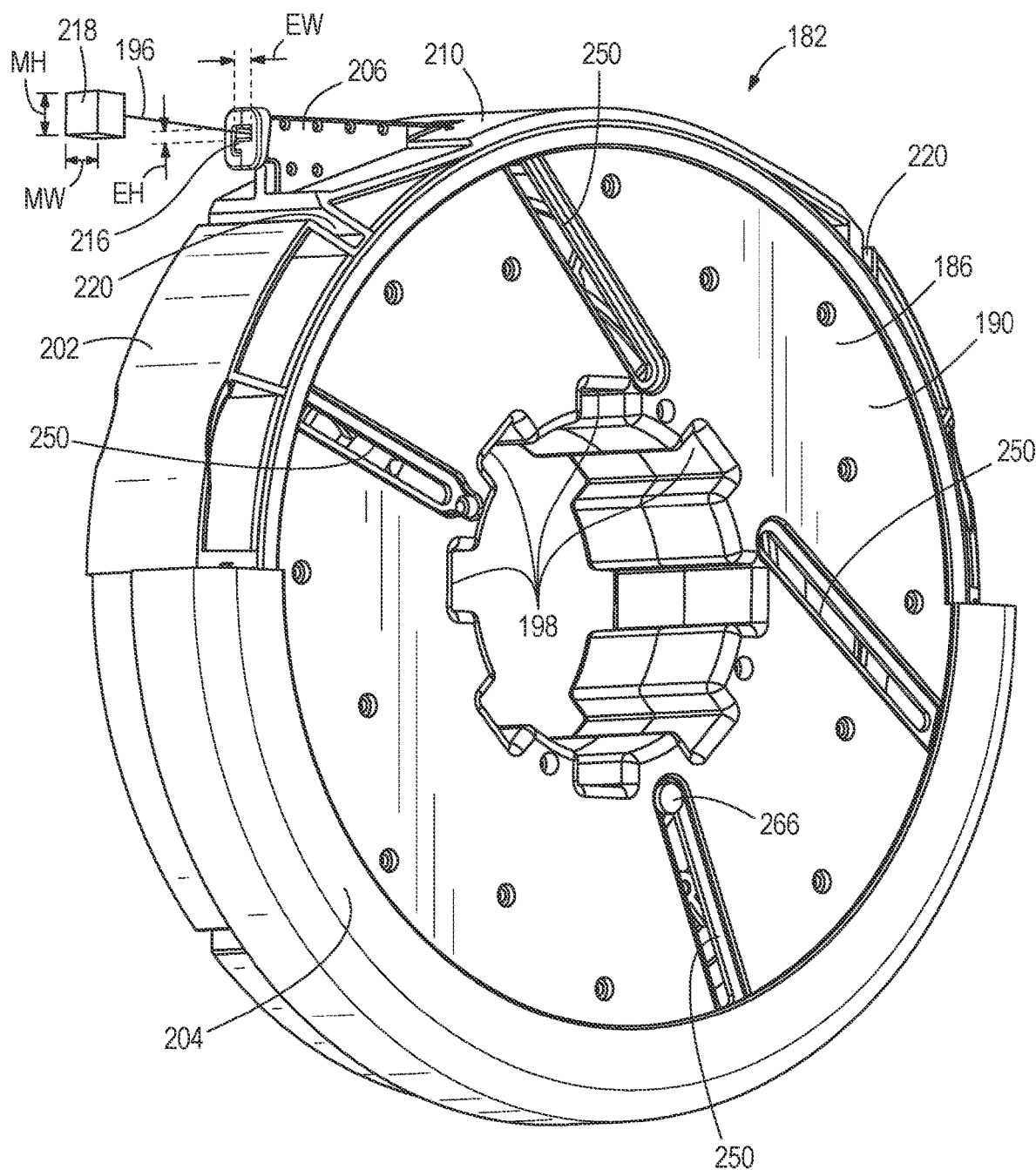
FIG. 14 is a perspective view of a fish tape drum according to another embodiment, with portions removed.
Figure 15:
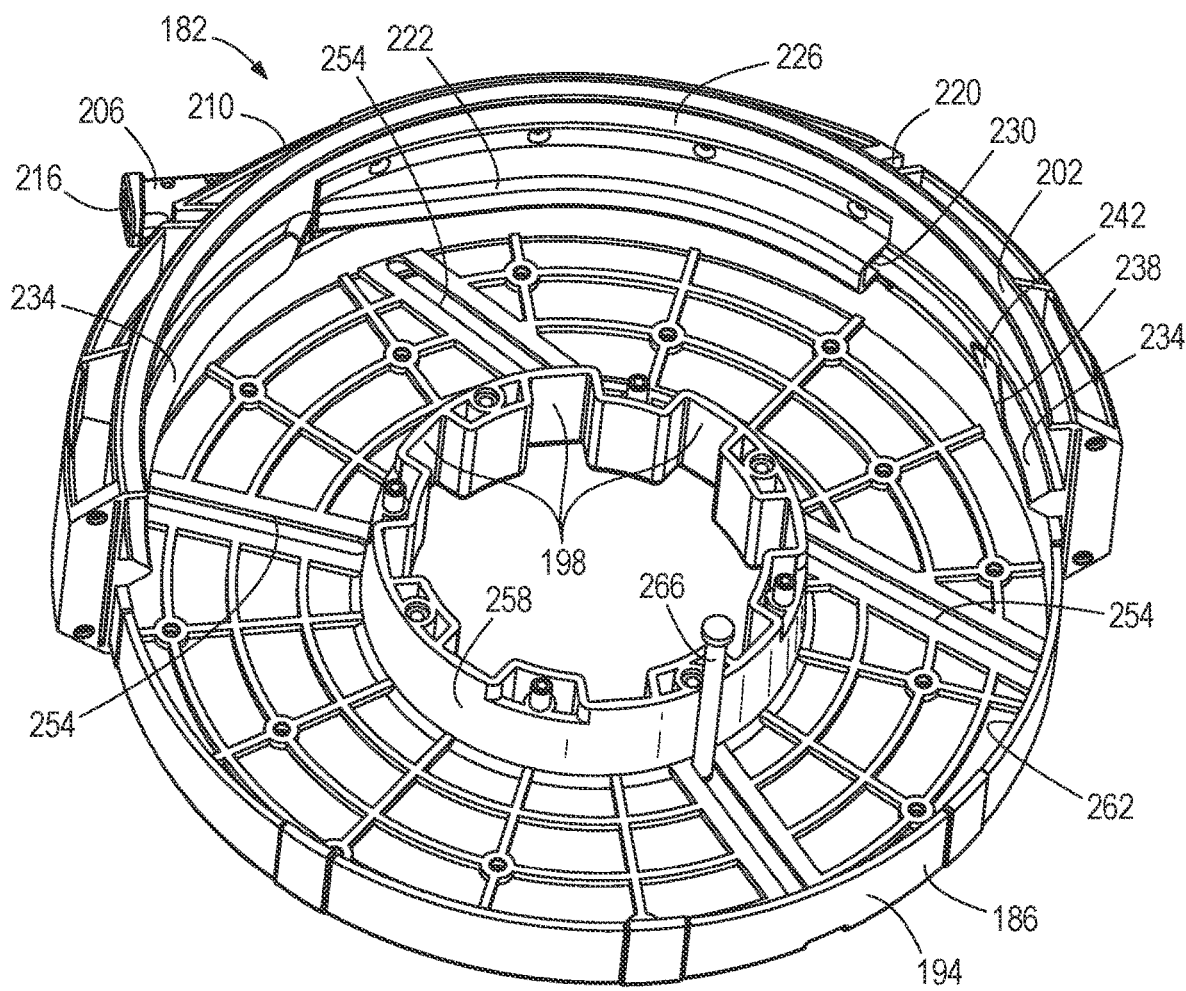
FIG. 15 is a perspective view of the fish tape drum of FIG. 14, with portions removed.
Figure 17:
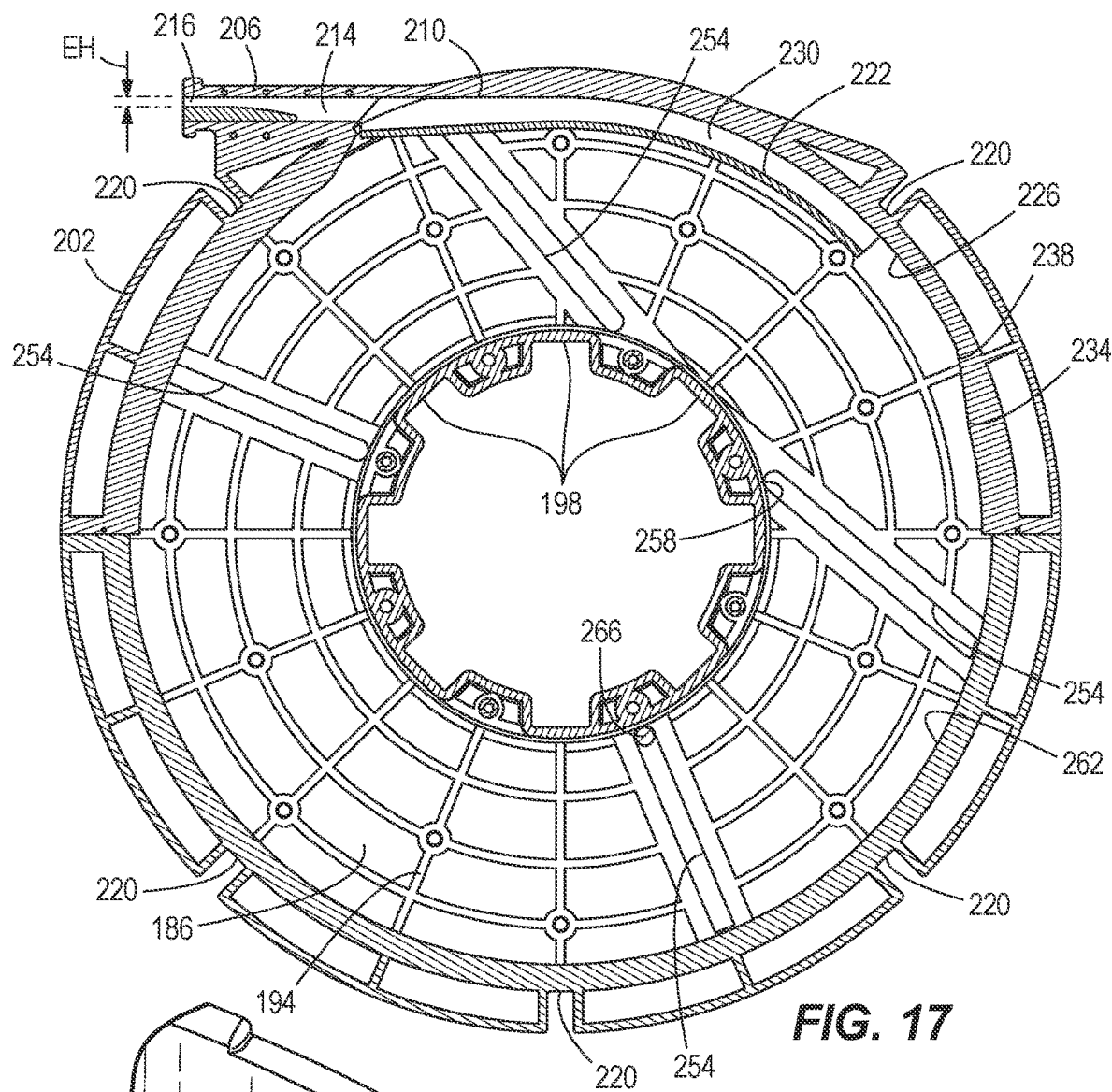
FIG. 17 is a cross-sectional view of the fish tape drum of FIG. 14.

With reference to FIGS. 14, 15 and 17, the frame 202 includes a nozzle 206 extending from an external surface 210 of the frame 202 and including a nozzle channel 214 defining an exit 216 for the fish tape 196. With reference to FIGS. 14 and 17, the exit 216 of the nozzle channel 214 has an exit width EW and an exit height EH. At least one of the exit width EW and the exit height EH are respectively less than a moving end height MH and a moving end width MW of a moving end 218 of the fish tape 196, which is arranged outside the fish tape drum 182. Thus, the moving end 218 is prevented from entering exit 216. The frame 202 also defines a plurality of radially inward-extending recesses 220 at the external surface 210, which serve the same function as the recesses 166 of frame 158 of fish tape drum 30.

With reference to FIGS. 15-17 and 33, the frame 202 includes a separator rib 222 extending radially inward from an inner surface 226 of the frame 202. The separator rib 222 includes a rib channel 230 extending through the rib 222 and leading to the nozzle channel 214, thus providing a passage for the fish tape 196 to exit and enter the drum portion 186. In some embodiments, the fish tape 196 is not provided in a single layer design. In other words, the fish tape 196 is not stacked one revolution on top of the next in a single column stack, such that multiple revolutions of the fish tape 196 are arranged approximately on the same plane as one another between the first and second clamshells 190, 194. Instead, the fish tape is freely located throughout the space in between the first and second clamshells 190, 194. In order to prevent the fish tape 196 from tangling and binding as the fish tape 196 is being dispensed from or retracted into the drum portion 186, the fish tape 196 in the drum portion 186 is prevented by the separating rib 222 from applying pressure against the portion of the fish tape 196 that is exiting or entering the rib channel 230, nozzle channel 214, and exit 216.

Figure 16:
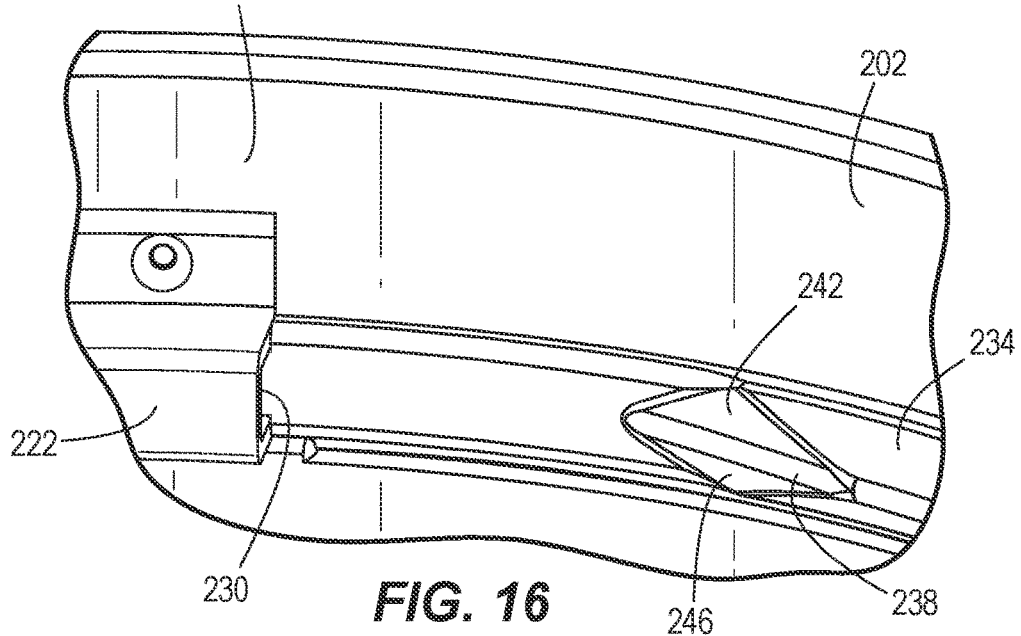
FIG. 16 is an enlarged perspective view of the fish tape drum of FIG. 14.

With continued reference to FIGS. 15-17 and 33, the frame 202 includes a diverter rib 234 extending approximately 290° around the circumference of the inner surface 226 of the frame 202. As shown in FIGS. 15 and 16, the diverter rib 234 includes a nose 238 having a first angled face 242 that is not parallel to the first clamshell 190 and a second angled face 246 that is not parallel to the second clamshell 194. As shown in FIG. 16, the nose 238 is arranged proximate to and on the same circumferential plane as the rib channel 230. As the fish tape 196 is retracted into the fish tape drum 182, instead of becoming frictionally locked on the diverter rib 234, the fish tape 196 is deflected away from the diverter rib 234 by one of the first or second angled faces 242, 246, such that the fish tape 196 is moved towards and into contact with one of the first or second clamshells 190, 194, which are rotating with respect to the frame 202 during the retraction operation.

In the embodiment of FIGS. 14, 15 and 17 and 19, the first clamshell 190 includes first slots 250 and the second clamshell 194 includes second slots 254 that are arranged in locations that correspond to the first slots 250, such that the first and second slots 250, 254 are aligned. The first and second slots 250, 254 extend between an inner wall 258 defining an inner diameter and an outer wall 262 defining an outer diameter of the first and second clamshells 190, 194, and thus the drum portion 186. An anchor member, such as pin 266, is arranged within a first slot 250 and a corresponding second slot 254. The pin 266 is moveable along the slots 250, 254, between a first position, in which the pin 266 is proximate the inner wall 258, and a second position, in which the pin 266 is proximate the outer wall 262. In other embodiments, such as the embodiment of FIGS. 31-33, the first clamshell 190 includes just one first slot 250 and the second clamshell 194 includes just one second slot 254.

The fish tape 196 includes an anchor end that is opposite of the moving end 218 and secured to the pin 266. In a retracting operation, when an operator is retracting the fish tape 196 into the drum portion 186, the pin 266 will automatically move towards the first position in response to the retracting rotation of the drum portion 186 until the pin 266 arrives at the first position. As the drum portion 186 continues its retracting rotation, the pin 266 will remain in the first position until the retracting operation is completed or the operator stops the retracting operation. Then, if an operator switches to a dispensing operation, as the fish tape 196 is dispensed from the drum portion 186, the pin 266 will move from the first position towards the second position in response to the dispensing rotation of the drum portion 186 until the pin 266 arrives at the second position. As the drum portion 186 continues its dispensing rotation, the pin 266 will remain in the second position until the dispensing operation is completed or the operator stops the dispensing operation.

Figure 18:
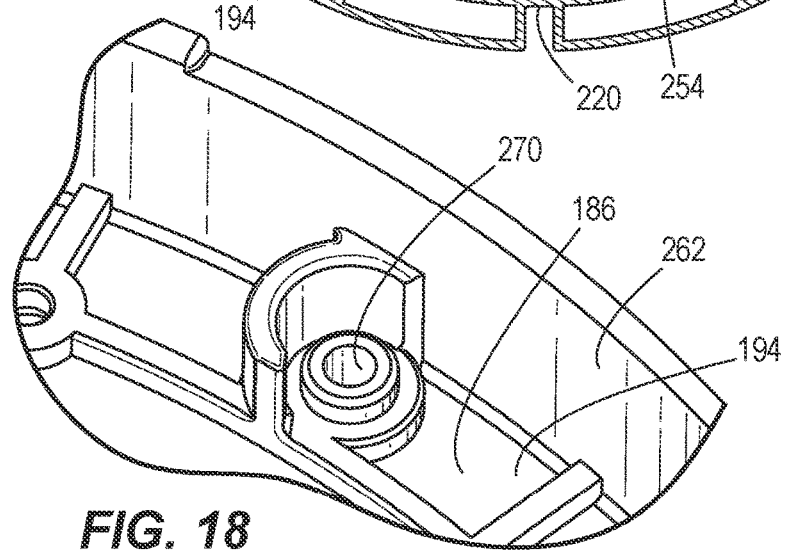
FIG. 18 is an enlarged perspective view of a fish tape drum according to another embodiment.
Figure 19:
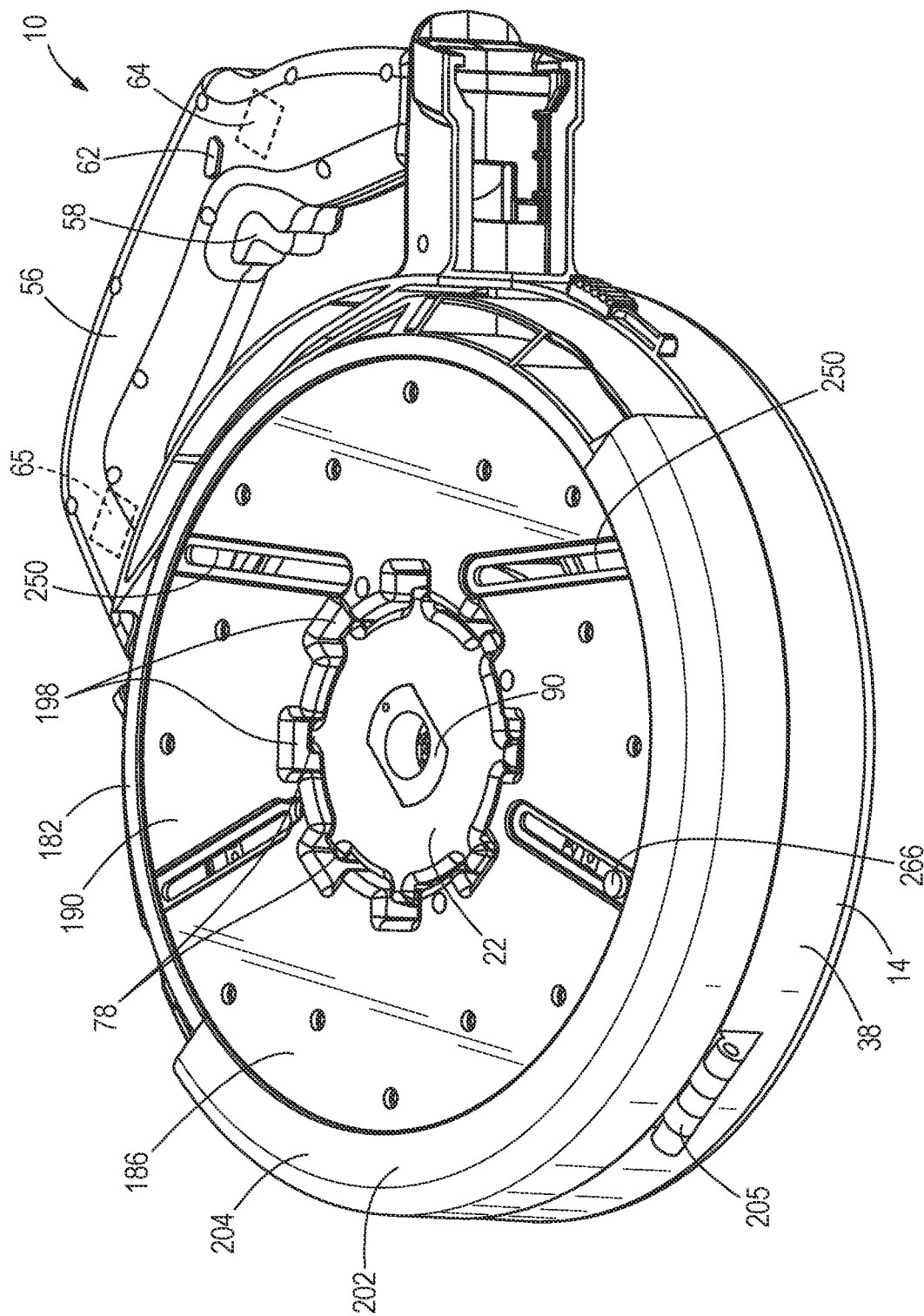
FIG. 19 is a perspective view of the fish tape drum of FIG. 14 received in a fish tape tool.

In another embodiment of fish tape drum 182 shown in FIG. 18, the anchor end of the fish tape 196 is secured at a fastening point 270 proximate the outer wall 262 of the drum portion 186. Thus, in the embodiment of FIG. 18, when the fish tape drum 182 includes a non-single layer tape, locating the fastening point 270 proximate the outer wall 262 of the drum portion eliminates "back-wind" and prevents the fish tape 196 from fouling when the fish tape 196 is dispensed under load.

Figure 20:
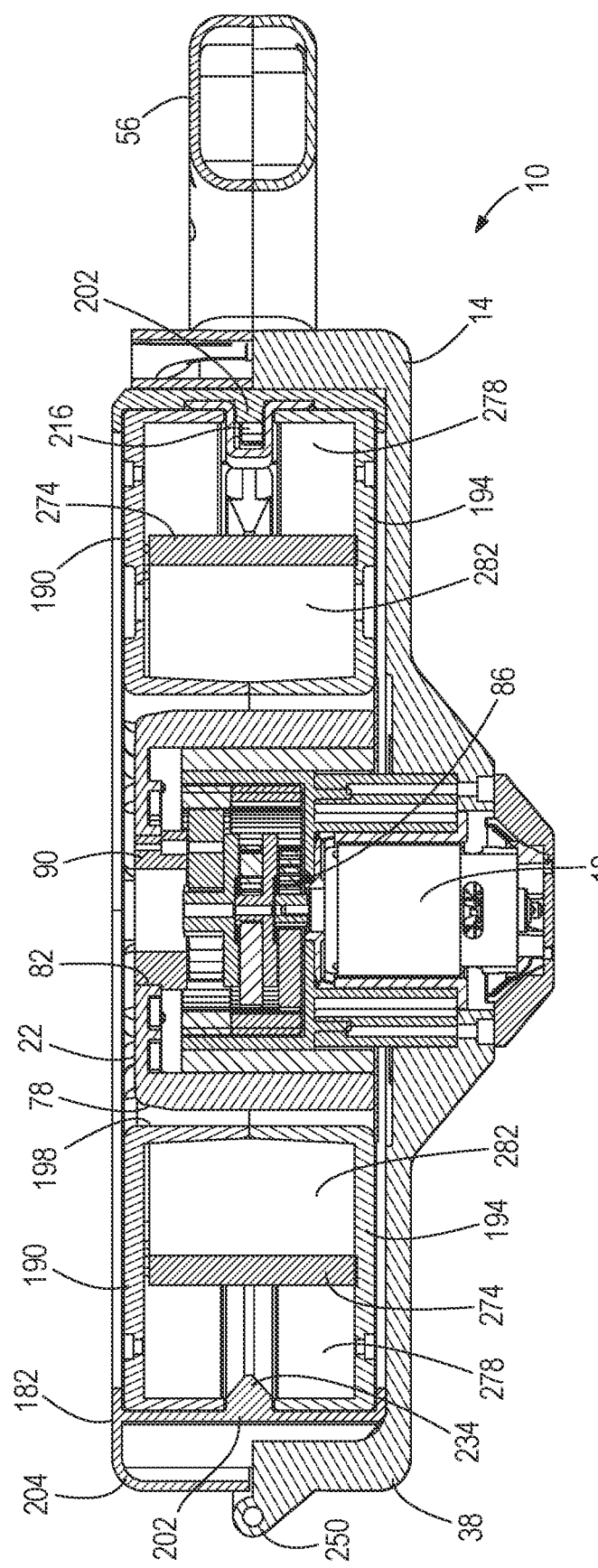
FIG. 20 is a cross-sectional view of a fish tape drum according to another embodiment.

In a different embodiment of the fish tape drum 182 shown in FIG. 20, the drum portion 186 includes an inner annular wall 274 to separate the drum portion 186 into an outer annular chamber 278 and an inner annular chamber 282. The inner annular wall 274 can be used to limit space inside the drum portion 186 for different types of fish tape. For instance, steel fish tape takes up less volume than the non-conductive fish tape. Thus, an operator can load the steel tape into the outer annular chamber 278, allowing the steel tape to fit more snugly within the drum portion 186 than in embodiments where the inner annular wall 274 is omitted. In this manner, the time it takes to dispense the steel tape can be reduced after the operator has pulled the trigger 58 for a dispensing operation.

Figure 21:
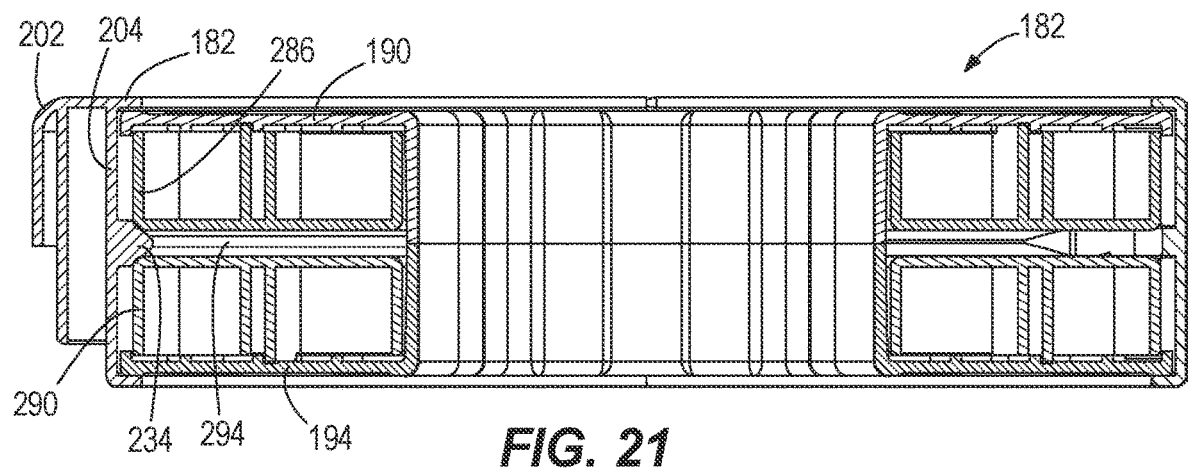
FIG. 21 is a cross-sectional view of the fish tape drum of FIG. 14 with a first insert and a second insert inserted into a drum portion.

In some embodiments, a first insert 286 and a second insert 290 are removably arranged between the first and second clamshells 190, 194 of the drum portion 186, such that a channel 294 is defined between the first and second inserts 286, 290, as shown in FIG. 21. In some embodiments, the first insert is removably coupled to the first clamshell 190 and the second insert 290 is removably coupled to the second clamshell 194, such that the first and second inserts 286, 290 are respectively coupled for rotation with the first and second clamshells 190, 194, which are coupled for co-rotation themselves. By arranging the first and second inserts 286, 290 within the drum portion 186, the axial spacing between the first and second clamshells 190, 194 is limited to the channel 294. Thus, when using single layer fish tape (omitted from FIG. 21 for clarity), the fish tape is limited to align itself, revolution upon revolution, within the channel 294. By forcing the single layer fish tape to be a single stacked column of tape within the channel 294, friction between the revolutions of fish tape is reduced.

Figure 22:
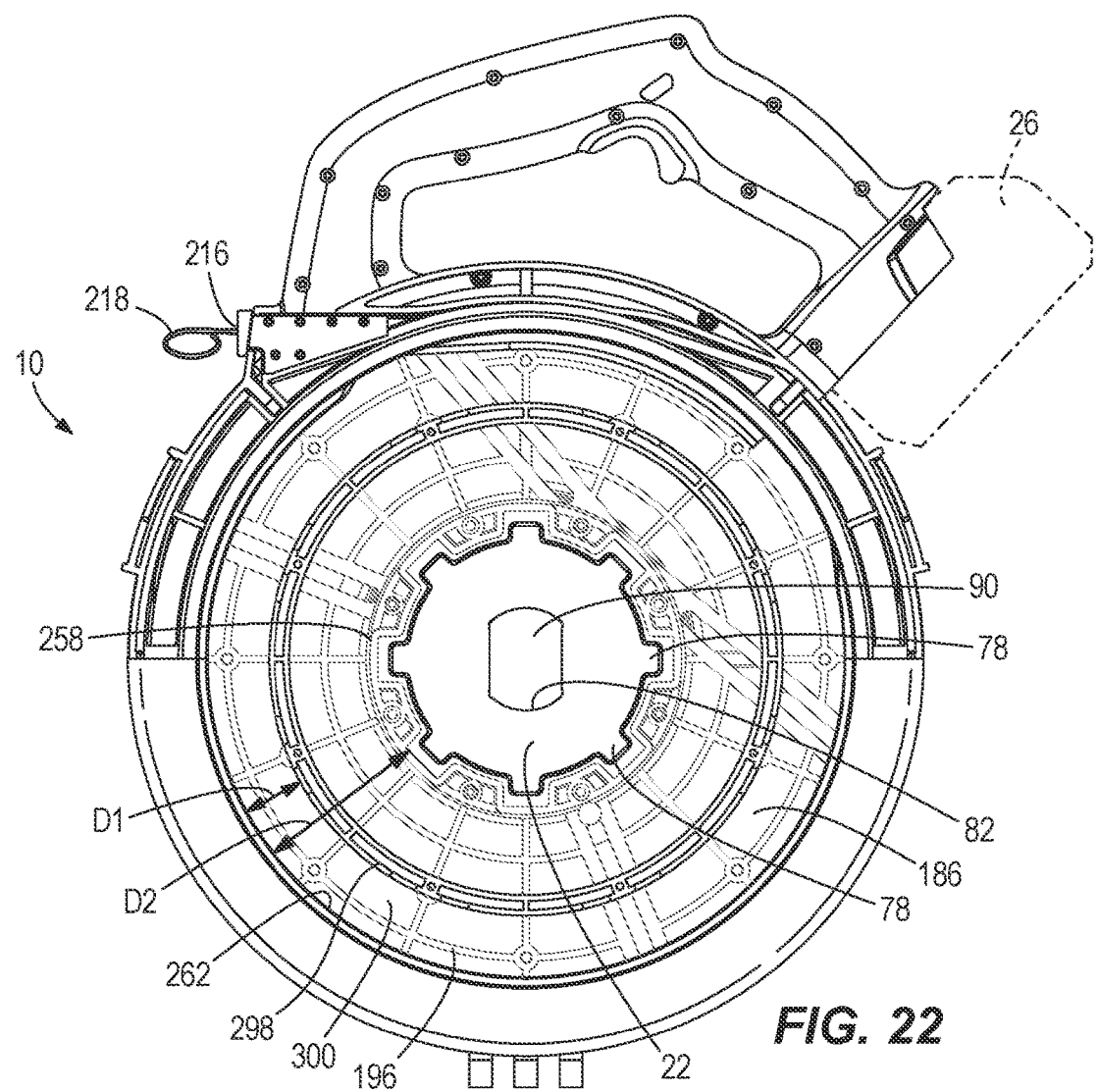
FIG. 22 is a perspective view of the fish tape drum of FIG. 14 with a third insert inserted into a drum portion.

In some embodiments, a third insert 298 is removably arranged in the drum portion 186 between the inner and outer walls 258, 262 of the drum portion 186, as shown in FIG. 22. The first clamshell 190 is clear plastic in FIG. 22 to illustrate the position of the third insert 298 relative to the inner and outer walls 258, 262. The fish tape 196 is arranged in a circumferential channel 300 between the third insert 298 and the outer wall 258. A first radial distance D1 is defined between the inner and outer walls 258, 262 of the drum portion 186 and a second radial distance D2 is defined between the third insert 298 and the outer wall 262. The second radial distance D2 is less than the first radial distance D1, such that the third insert 298 functions to limit the radial space in which the fish tape 196 is arranged in the drum portion 186, i.e. the channel 300, making the third insert 298 an effective addition for shorter-length fish tape 196. Specifically, by inserting the third insert 298 into the drum portion 186, the lag time between initiating a feeding operation with trigger 58 and the point at which the moving end 218 of the fish tape 196 begins dispensing is reduced for shorter-length fish tape 196.

Figure 23:
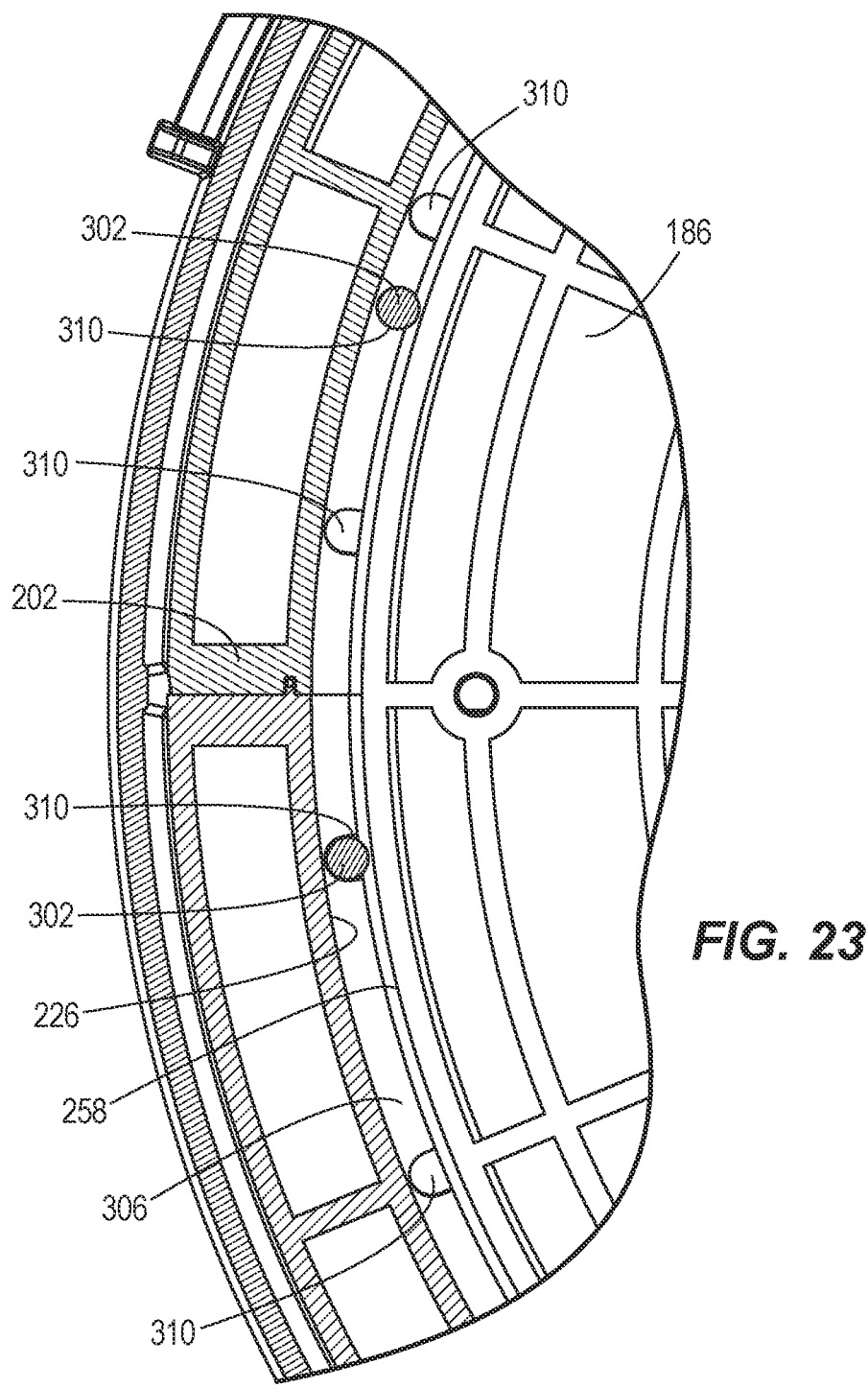
FIG. 23 is a cross-sectional view of a fish tape drum according to another embodiment.

In some embodiments, instead of a diverter rib 234, the frame 202 includes bearings 302 on an inner edge 306 adjacent the inner surface 226, as shown in FIG. 23. Specifically, the bearings 302 are arranged in bores 310 in the inner edge 310 and are configured to rotate with respect to the inner edge 310. In some embodiments, the bearings 302 are needle bearings. The outer wall 258 of the drum portion 186 is configured to move along the bearings 302 as the drum portion 186 rotates relative to the frame 202, thus reducing friction between the outer wall 258 and the frame 202.

Figure 24:
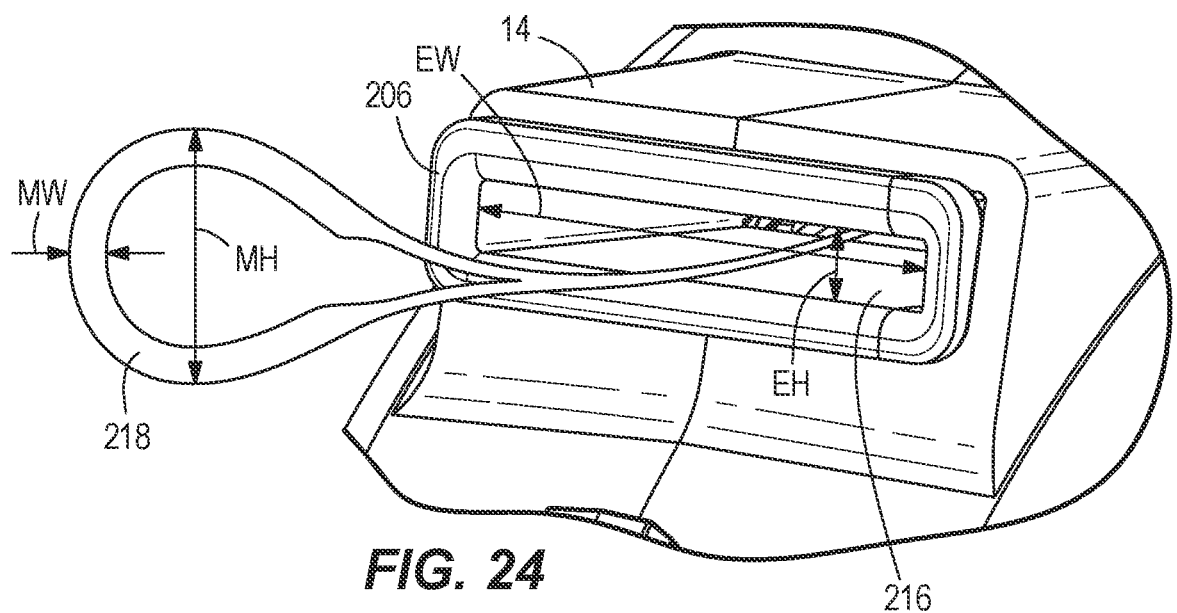
FIG. 24 is a perspective view of nozzle of a fish tape drum according to another embodiment.

In some embodiments, the exit 216 for the fish tape 196 is modified such that the exit width EW is wider than the moving end width MW, while the exit height EH still remains less than the moving height MH of the moving end 218 of the fish tape, as shown in FIG. 24. The exit width EW is much greater than the exit height EH, such that the fish tape 196 is not restricted as it is dispensed or retracted into the exit 216. In some embodiments, the length of the exit width EW is more than four times the length than the exit height EH. Also, because the exit height EH is less than the moving height MH of the moving end 218, the moving end 218 is prevented from being retracted into the exit 216.

Figure 25:
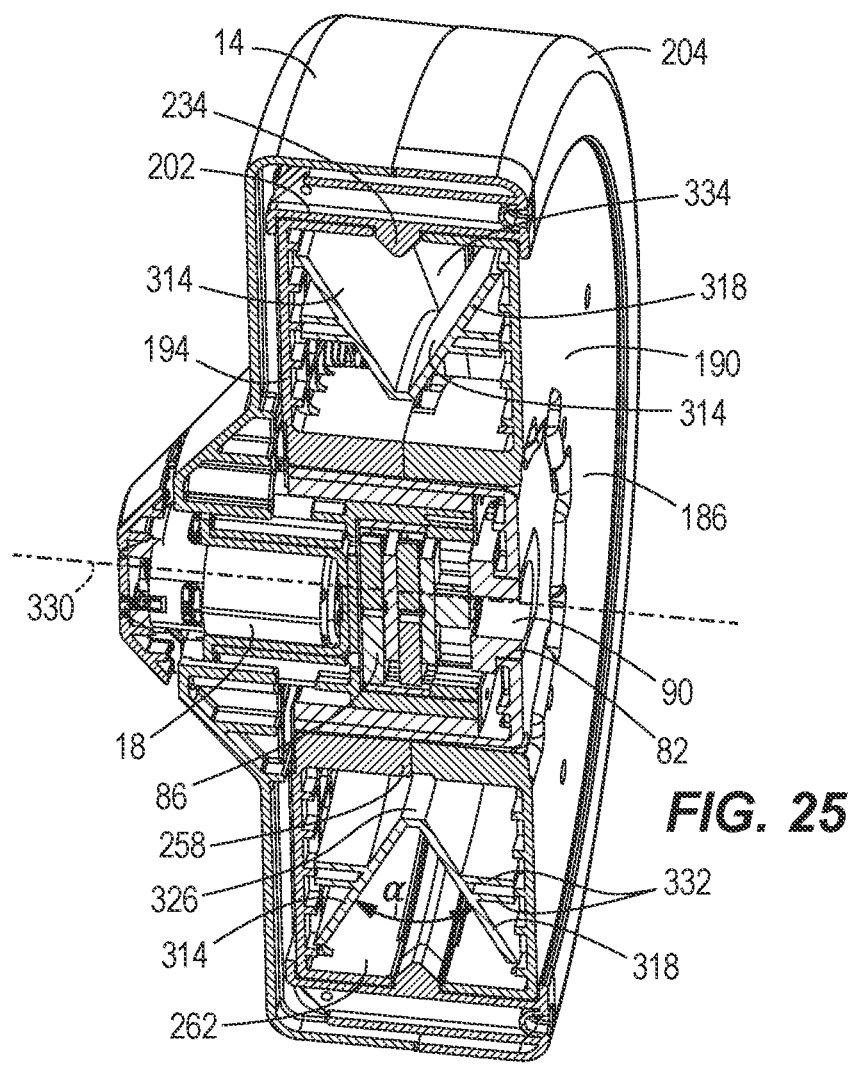
FIG. 25 is a cross-sectional view of the fish tape drum of FIG. 14 with a fourth insert inserted into a drum portion.

In some embodiments, a fourth insert 314 is removably arranged in the drum portion 186, as shown in FIG. 25. The fourth insert 314 has a first wall 318 and a second wall 322 forming a cross-sectional V-shape. An acute angle α is defined between the first and second walls 318, 322. The fourth insert 314 also includes a joining portion 326 that joins the first and second walls 318, 322. The joining portion 326 is approximately parallel to an axis of rotation 330 about which the drum portion 186 rotates. In the illustrated embodiment, the joining portion 326 is spaced from the inner wall 258 of the drum portion 186. In the illustrated embodiment, a plurality of ribs 332 enable the fourth insert 315 to be removably coupled to the first and second clamshells 190, 194 of the drum portion 186. A channel 334 is defined between the first and second walls 318, 322 and in operation, the fish tape 196 is arranged in the channel 334 (but is omitted from FIG. 25 for clarity).

As shown in FIG. 25, a distance between the first and second walls 318, 322 increases when moving in a direction from the rotational axis 330 toward the outer wall 262 of the drum portion 186. In other words, the channel 334 gets progressively wider when moving in a direction from the rotational axis 330 toward the outer wall 262 of the drum portion 186. The fourth insert 314 thus provides a wider space for the fish tape 196 near the outer wall 262, proximate the channel 230 leading to the exit 216, and a narrower space for the fish tape 196 near joining portion 326. The progressively widening channel 334 helps the fish tape 196 to layer more evenly in the drum portion 186 and prevents the fish tape 196 from tangling during a feeding operation. The progressively widening channel 334 also helps prevent steel fish tape from binding.

Figure 26:
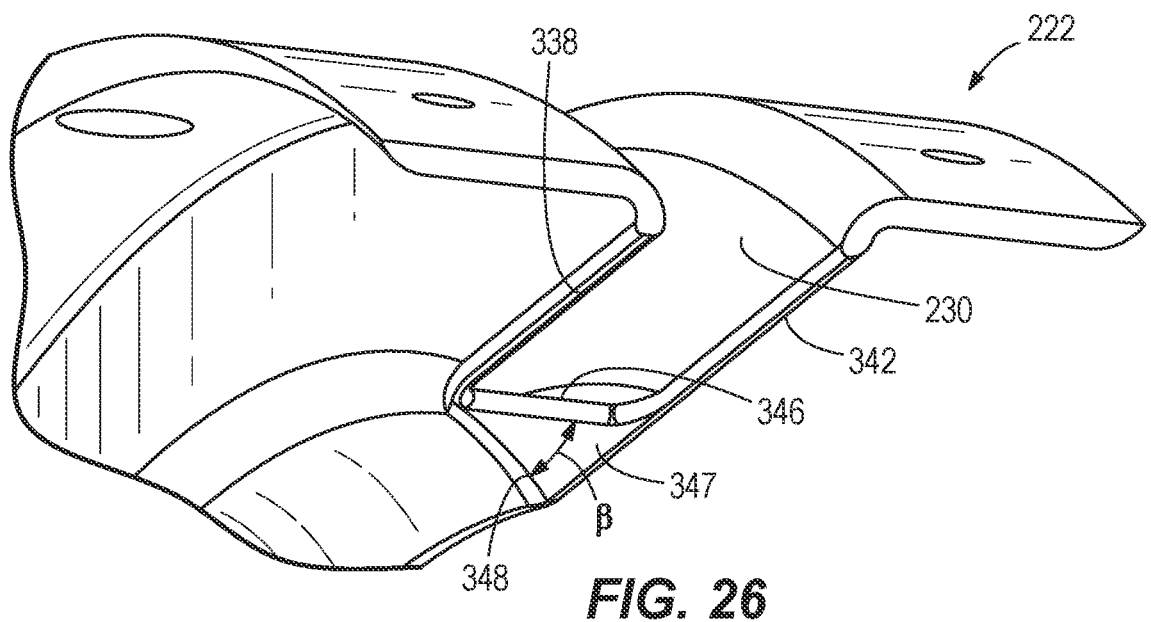
FIG. 26 is an enlarged perspective view of a separator rib of a fish tape drum according to another embodiment.
Figure 27:
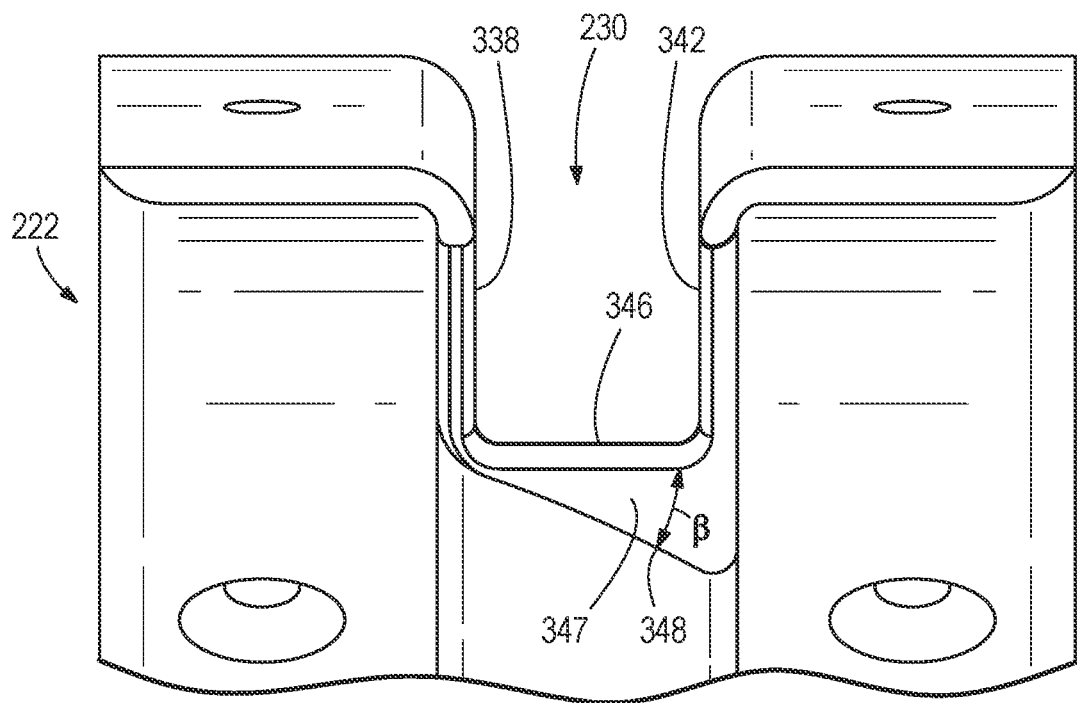
FIG. 27 is a plan view of the separator rib of FIG. 26.

In some embodiments of the separator rib 222, the rib channel 230 arranged in the separator rib 222 is defined by two side walls 338, 342 and a bottom wall 346 of the separator rib 222, as shown in FIGS. 26, 27 and 33. The separator rib 222 further includes an angled protrusion 347 extending inwardly from the bottom wall 346 and having an angled edge 348 that forms an acute angle β with respect to the bottom wall 346. Thus, as the fish tape 196 stacks on itself during a retracting operation, the angled protrusion 347 tends to push the layers of fish tape 196 off to either side of the separator rib 222, in order to inhibit the fish tape 196 from forming in a single column layered on itself.

Figure 28:
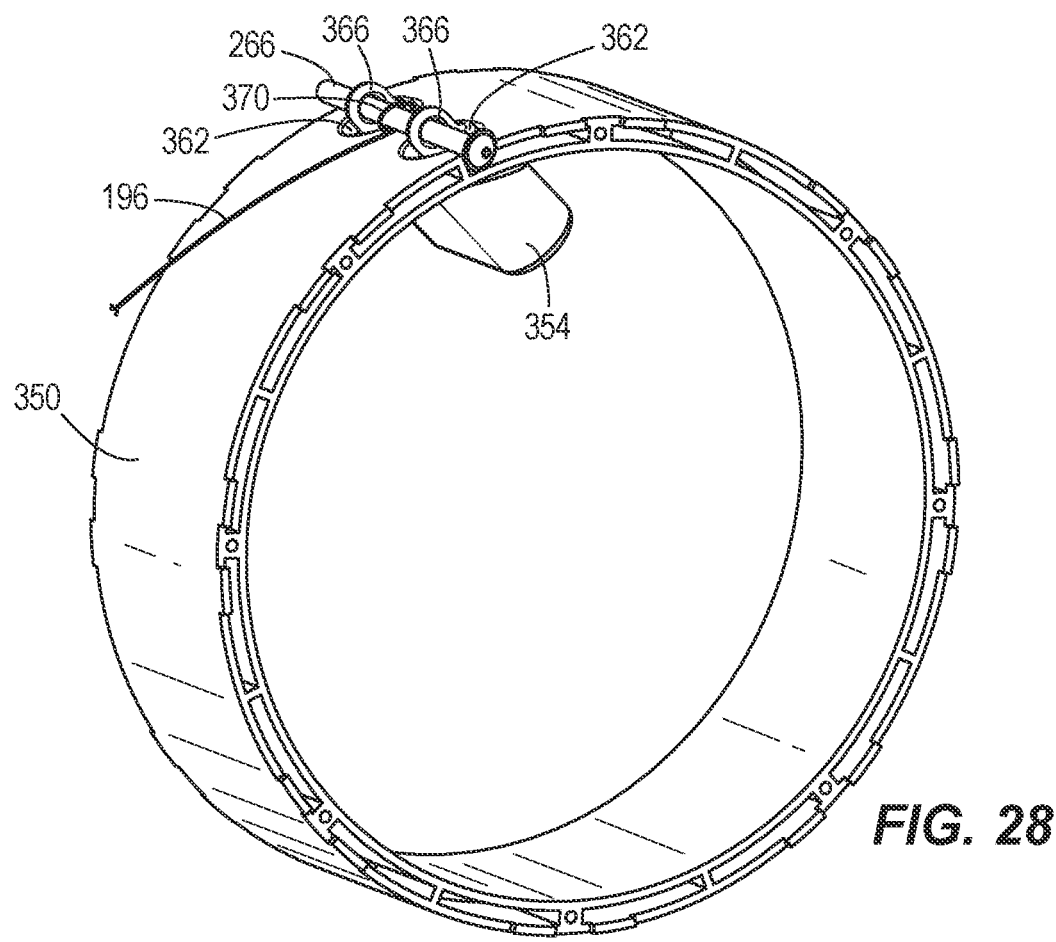
FIG. 28 is a perspective view of an intermediate wall of a drum portion of the fish tape drum of FIG. 14, according to another embodiment.
Figure 29:
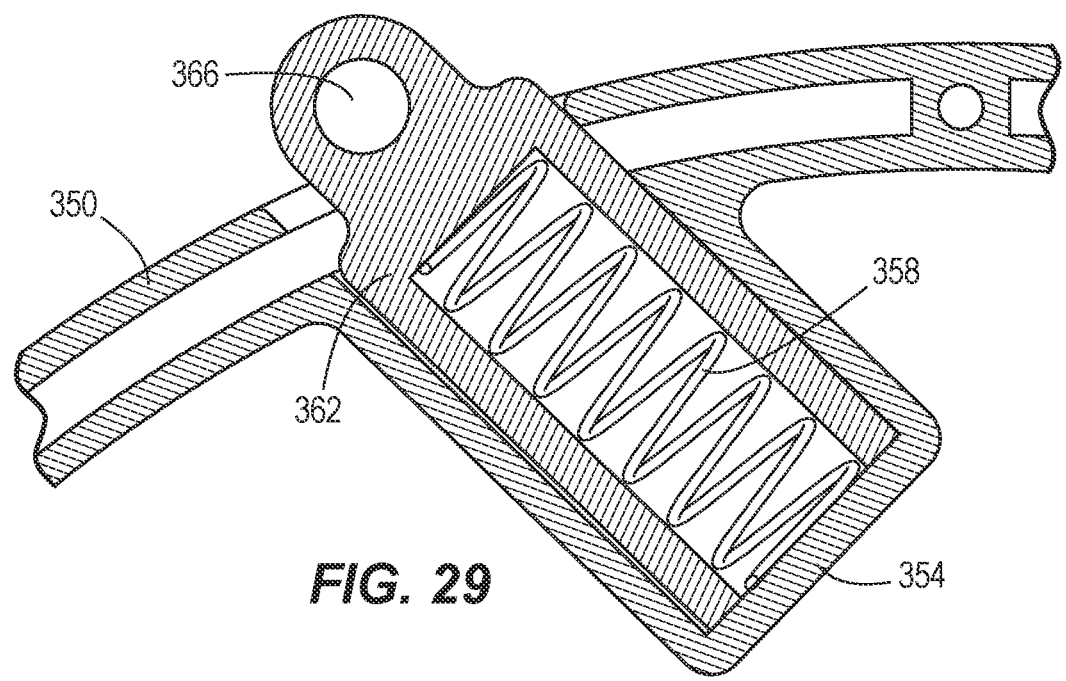
FIG. 29 is a cross-sectional view of the intermediate wall of FIG. 28.

In the embodiments of FIGS. 28 and 29 and 31-33 the drum portion 186 includes an intermediate wall 350 coupled between the first and second clamshells 190, 194 and radially arranged between the inner and outer walls 258, 262 of the drum portion 186. Only the intermediate wall 350 is shown in FIGS. 28 and 29, for clarity. However, the intermediate wall 350 is shown in the drum portion 186 in FIG. 33. The fish tape 196 is arranged between the intermediate wall 350 and the outer wall 262 within the drum portion 186. The intermediate wall 350 includes a well 354 that functions as a spring seat for a pair of biasing members, such as springs 358. The springs 358 respectively bias a pair of holding members 362 outwardly from the intermediate wall 350. The holding members 362 each include an aperture 366 in which the movable anchor, such as the pin 266, is retained. Thus, the pin 266, arranged in the slots 250, 254 (FIGS. 14 and 15), is biased by the springs 358 toward the second position of the pin 266, in which the pin 266 is proximate the outer wall 262, such that during a retracting or dispensing operation, an anchor end 370 of the fish tape 196 is biased toward the outer wall 262 of the drum portion 186 to eliminate tangling of the fish tape 196 until the spring force is overcome. In the embodiments of FIGS. 28, 29 and 31-31, the first position of the pin 266 is proximate the intermediate wall 350 rather than the inner wall 258.

Figure 30:
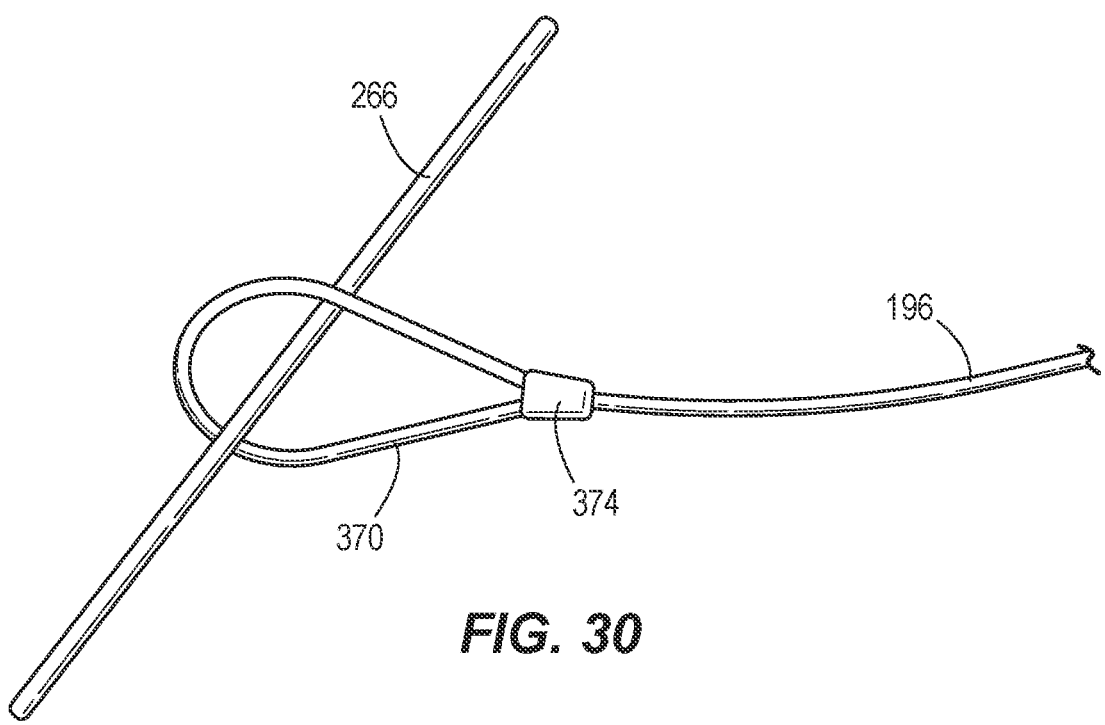
FIG. 30 is a perspective view of an anchor end of a fish tape coupled to an anchor, according to another embodiment.

In the embodiment of FIG. 30, the anchor end 370 of the fish tape 196 is looped over the pin 266 and welded to itself at a weld point 374, which provides a high strength connection of the fish tape 196 to the pin 266.

Figure 34:
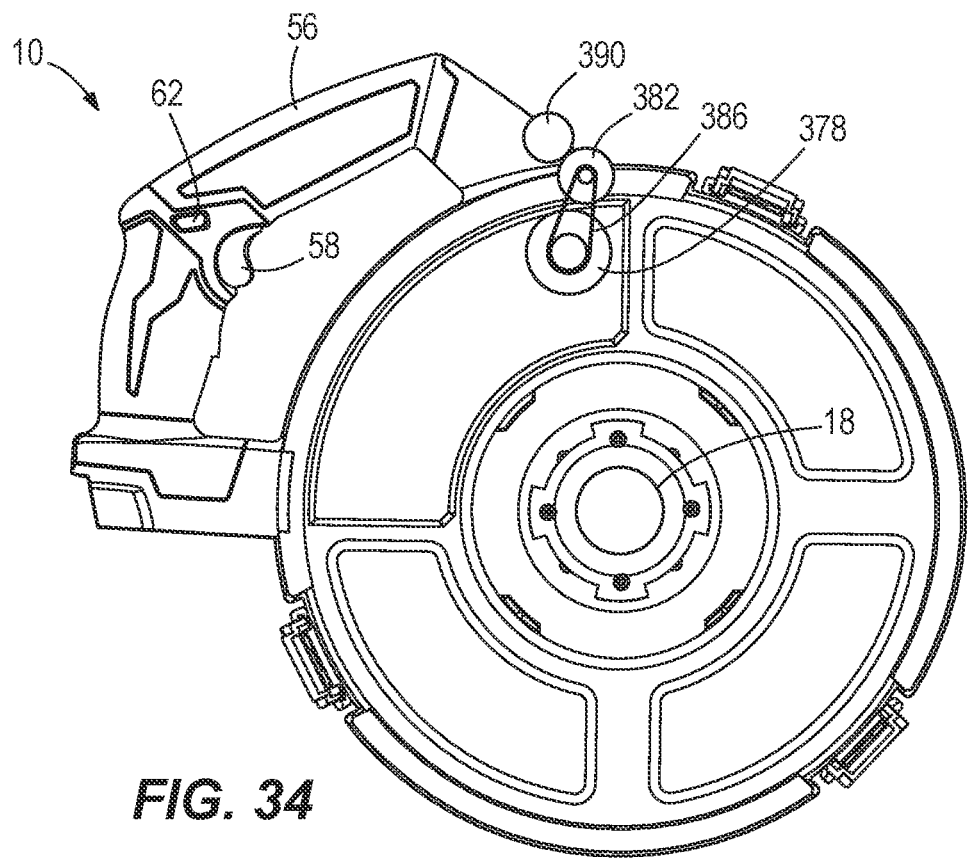
FIG. 34 is a schematic view of another embodiment of a fish tape tool.

FIG. 34 illustrates a fish tape tool 10 that is similar to the fish tape tool of FIGS. 31-33, except for the following differences explained below. Specifically, the fish tape tool 10 includes a second motor 378 that is coupled to a drive roller 382 via a belt 386 or second transmission. The drive roller 382 and an adjacent idler roller 390 are arranged proximate the nozzle 206 or rib channel 230 (not shown in FIG. 34 but see FIG. 33). In the embodiment of FIG. 34, the first motor 18 is used only to retract the fish tape 196. The second motor 378 is included only for dispensing the fish tape 196, which is wedged between the drive roller 382 and idler roller 390 by a clamping force. Thus, in a dispensing operation, the second motor 378 rotates the drive roller 382 and because the fish tape 196 is clamped between the drive and idler rollers 382, 390, rotation of the drive roller 382 forces the fish tape 196 out of the nozzle 206. In the embodiment of FIG. 34, the first transmission 86 has a clutch to clutch out the first motor 18 during a dispensing operation and the second motor 378 also has a clutch mechanism, such as in the second transmission, to clutch out the second motor 378 during a retracting operation. Thus, during the dispensing operation, even though dispensing of the fish tape 196 causes the drum portion 186 to rotate relative to the frame 202, thus causing the output reel 22 to rotate, rotation of the output reel 22 is not translated back through to the first motor 18 because of the clutch in the transmission 86. During a retracting operation, even though retraction of the fish tape 196 causes the drum portion 186 to rotate relative to the frame 202, thus causing the drive roller 382 to rotate as the fish tape 186 moves between the driver roller 382 and the idler roller 390, rotation of the drive roller 382 is not translated to the second motor 378 because of the clutch mechanism, e.g., in the second transmission.

Figure 35:
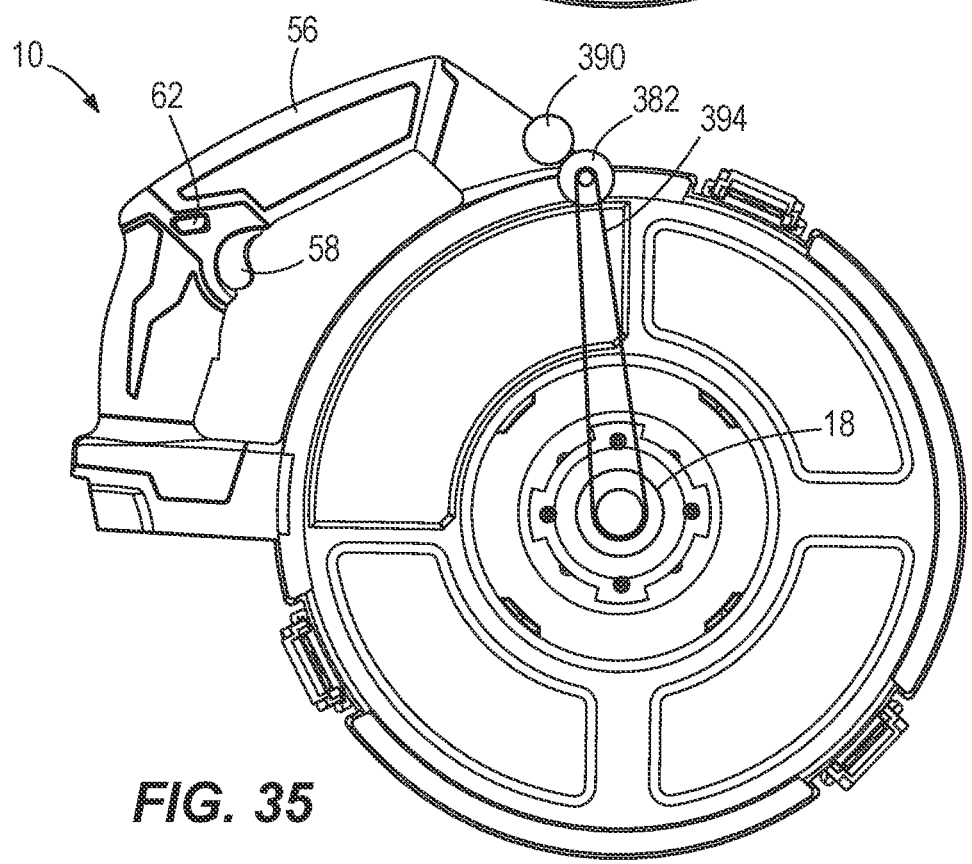
FIG. 35 is a schematic view of another embodiment of a fish tape tool.

FIG. 35 illustrates a fish tape tool 10 that is similar to the fish tape tool of FIG. 34, except for the following differences explained below. Specifically, the fish tape tool 10 includes the drive roller 382 and idler roller 390 of the embodiment of FIG. 34, but omits the second motor 378 and the belt 386 or second transmission. Instead, a belt 394 or second transmission transmits torque between the motor 18 and the drive roller 382. In the embodiment of FIG. 35, the drive and idler rollers 382, 390 include one way needle bearings. Thus, during the dispensing operation, the drive roller 382 receives torque from the motor 18 via the belt 394 or second transmission and the fish tape 196 is forced out of the nozzle 206 in a similar manner as in the embodiment of FIG. 34.

During a retracting operation, as the fish tape 196 is retracted between the drive and idler rollers 382, 390, the drive and idler rollers 382, 390 spin freely via the one way needle bearings, such that rotation of the drive roller 382 does not transmit torque back to the motor 18 via the belt 394 or second transmission.

Figure 36:
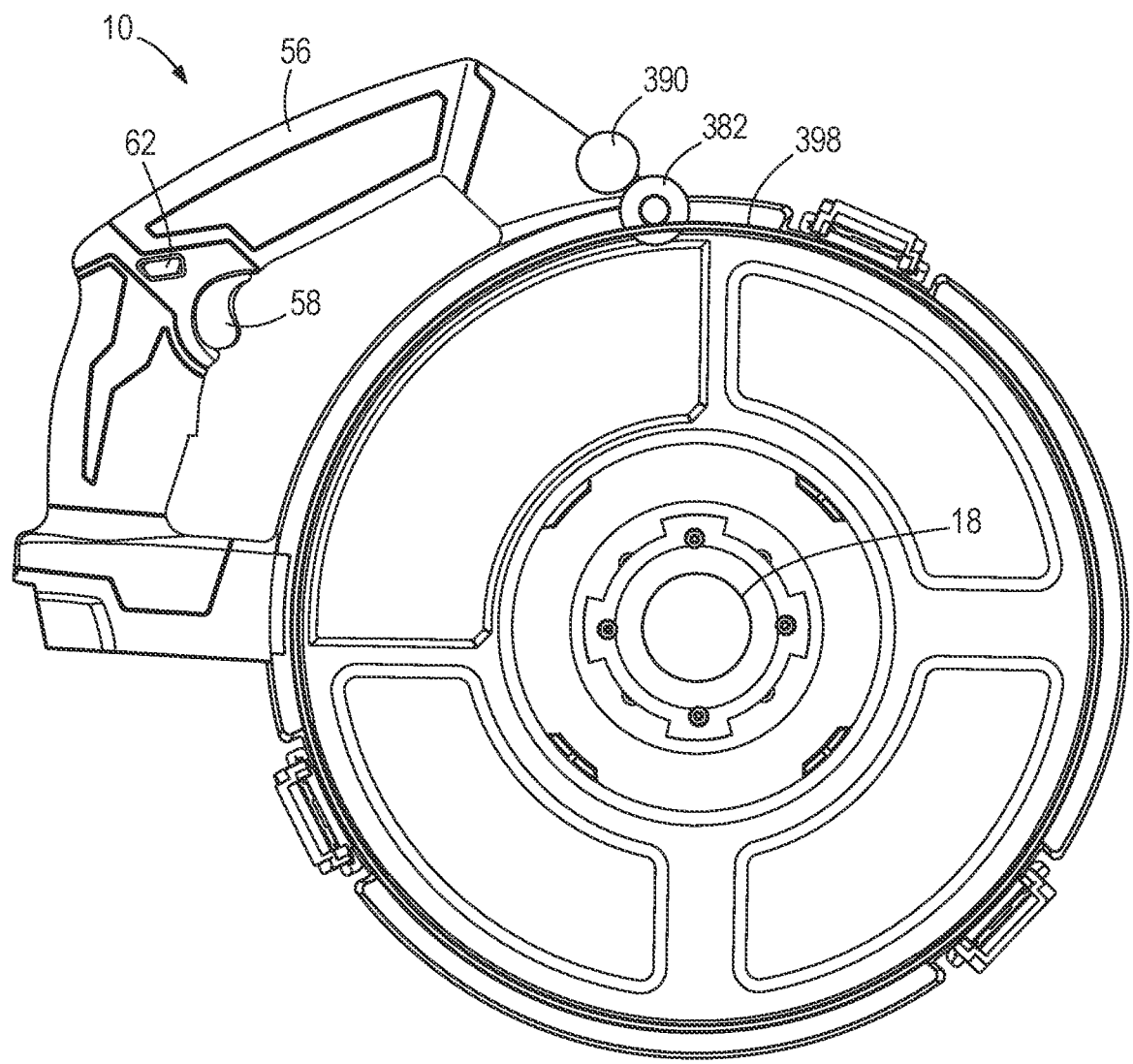
FIG. 36 is a schematic view of another embodiment of a fish tape tool.

FIG. 36 illustrates a fish tape tool 10 that is similar to the fish tape tool of FIG. 35, except for the following differences explained below. Specifically, the fish tape tool 10 includes the drive roller 382 and idler roller 390 of the embodiment of FIG. 34, but omits the belt 394 or second transmission between the motor 18 and the drive roller 382. Instead, the outer wall 262 of the drum portion 186 of the fish tape drum 182 includes a ring gear 398 that meshes with the drive roller 382. Thus, during the dispensing operation, the drum portion 186 is rotated by the output reel 22, causing the ring gear 398 to rotate the drive roller 382, such that the fish tape 196 is forced out of the nozzle 206 in a similar manner as in the embodiment of FIG. 35. During a retracting operation, as the fish tape 196 is retracted between the drive and idler rollers 382, 390, the drive and idler rollers 382, 390 spin freely via the one way needle bearings, such that rotation of the drive roller 382 does not transmit torque back to the motor 18 via the ring gear 398.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Various features of the invention are set forth in the following claims.

What is claimed is:

1. A fish tape tool comprising:
    a housing including a base and a cover;
    a chamber defined in the housing between the base and the cover;
    a handle coupled to the base, the handle including a battery connection portion and a trigger, the trigger located in an opening defined between the handle and the base;
    a drum configured to be inserted into the chamber of the housing, the drum containing a fish tape, the drum rotatable relative to the housing to dispense or retract the fish tape from the housing,
    wherein the drum is one of a plurality of drums that are insertable into and removable from the chamber of the housing, each drum containing a different type of fish tape; and
    wherein the drum is configured to be manually rotated relative to the housing to dispense or retract the fish tape.

2. The fish tape tool of claim 1, wherein the housing has an exit for the fish tape to move through in response to the drum rotating relative to the housing.

3. The fish tape tool of claim 1, wherein the housing includes a grip portion.

4. The fish tape tool of claim 1, wherein the drum includes two clamshells with the fish tape contained between the two clamshells.

5. The fish tape tool of claim 1, wherein the cover is moveable relative to the base between an open position, in which the chamber is exposed to remove or insert the drum, and a closed position, in which the cover is coupled to the base, such that the drum is not removable from or insertable into the chamber.

6. The fish tape tool of claim 5, further comprising a securing member to secure the cover to the base in the closed position.

7. The fish tape tool of claim 1, wherein one of the different types of fish tape is steel.

8. The fish tape tool of claim 1, wherein one of the different types of fish tape is conductive.

9. The fish tape tool of claim 1, wherein one of the different types of fish tape is non-conductive.

10. A fish tape assembly comprising:
    a fish tape tool including a housing including a first clamshell and a second clamshell, and a chamber defined in the housing between the first clamshell and the second clamshell;
    a handle coupled to the first clamshell, the handle including a trigger and a directional shuttle mechanism, the trigger positioned within an opening between the handle and the first clamshell;
    a battery connection portion;
    a first drum configured to be removably inserted into the chamber of the housing, the first drum containing a first fish tape; and
    a second drum configured to be removably inserted into the chamber of the housing, the second drum containing a second fish tape that is different than the first fish tape, the first drum and the second drum being alternately received in the chamber of the housing,
    wherein when the first drum is in the chamber of the housing and the first drum is rotated in a first rotational direction relative to the housing, the first fish tape is dispensed from the housing,
    wherein when the first drum is in the chamber of the housing and the first drum is rotated in a second rotational direction relative to the housing, the first fish tape is retracted into the housing, the second rotational direction being opposite from the first rotational direction,
    wherein when the second drum is in the chamber of the housing and the second drum is rotated in the first rotational direction relative to the housing, the second fish tape is dispensed from the housing, and
        wherein when the second drum is in the chamber of the housing and the second drum is rotated in the second rotational direction relative to the housing, the second fish tape is retracted into the housing.

11. The fish tape assembly of claim 10, wherein the fish tape tool includes a motor supported by the housing, the motor configured to provide torque to the first drum when the first drum is in the chamber of the housing, such that the first drum is rotatable by the motor relative to housing to dispense or retract the first fish tape from the housing, the motor configured to provide torque to the second drum when the second drum is in the chamber of the housing, such that the second drum is rotatable by the motor relative to the housing to dispense or retract the second fish tape from the housing.

12. The fish tape assembly of claim 10, wherein when the first drum is in the chamber, the first drum is configured to be manually rotated relative to the housing to dispense or retract the first fish tape, and wherein when the second drum is in the chamber, the second drum is configured to be manually rotated relative to the housing to dispense or retract the second fish tape.

13. The fish tape assembly of claim 10, wherein the housing of the fish tape tool has an exit, wherein the first fish tape moves through the exit when the first drum is in the chamber and the first drum is rotated relative to the housing, and wherein the second fish tape moves through the exit when the second drum is in the chamber and the second drum is rotated relative to the housing.

14. The fish tape assembly of claim 10, wherein the housing includes a grip portion.

15. The fish tape assembly of claim 14, wherein the first clamshell is moveable relative to the second clamshell between an open position, in which the chamber is exposed to remove or insert one of the first or second drums, and a closed position, in which the first clamshell is coupled to the second clamshell, such that the first or second drums are not removable from or insertable into the chamber.

16. The fish tape tool of claim 15, further comprising a securing member to secure the first clamshell to the second clamshell in the closed position.

17. A method of operating a fish tape assembly, the fish tape assembly including a first drum containing a first fish tape, a second drum containing a second fish tape that is different than the first fish tape, a housing including a first clamshell and a second clamshell that define a chamber therebetween, and a handle coupled to the first clamshell, the handle including a battery connection portion and a trigger, the trigger located in an opening defined between the first clamshell and the base, the method comprising:

rotating the first drum within the chamber and relative to the housing to dispense the first fish tape from the housing;

moving the first clamshell relative to the second clamshell from a closed position to an open position;

replacing the first drum with the second drum within the chamber of the housing while the first clamshell is in the open position;

moving the first clamshell relative to the second clamshell from the open position to the closed position after the second drum is replaced in the chamber; and rotating the second drum within the chamber and relative to the housing to dispense the second fish tape from the housing.

18. The method of claim 17, wherein rotating the first drum within the chamber and relative to the housing includes manually rotating the first drum within the chamber and relative to the housing.

19. The method of claim 17, wherein rotating the first drum includes rotating the first drum in a first rotational direction relative to the housing to dispense the first fish tape from the housing, and wherein the method further comprises rotating the first drum within the chamber in a second rotational direction relative to the housing to retract the first fish tape into the housing.

* * * * *